United States Patent
Tago et al.

(10) Patent No.: US 11,080,258 B2
(45) Date of Patent: Aug. 3, 2021

(54) TABLE GENERATION BASED ON SCRIPTS FOR EXISTING TABLES

(71) Applicant: FUJITSU LIMITED, Kawasaki (JP)

(72) Inventors: Shinichiro Tago, Shinagawa (JP); Shuya Abe, Kawasaki (JP); Mitsuru Oda, Tokyo (JP); Noriyuki Kobayashi, Kawasaki (JP); Masaru Fuji, Musashino (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 16/411,956

(22) Filed: May 14, 2019

(65) Prior Publication Data

US 2019/0361862 A1  Nov. 28, 2019

(30) Foreign Application Priority Data

May 28, 2018  (JP) .............................. JP2018-101494

(51) Int. Cl.
| | |
|---|---|
| *G06F 16/00* | (2019.01) |
| *G06F 16/22* | (2019.01) |
| *G06F 16/21* | (2019.01) |
| *G06F 16/2455* | (2019.01) |
| *G06F 8/36* | (2018.01) |

(52) U.S. Cl.
CPC ............ *G06F 16/2282* (2019.01); *G06F 8/36* (2013.01); *G06F 16/213* (2019.01); *G06F 16/221* (2019.01); *G06F 16/2456* (2019.01)

(58) Field of Classification Search
CPC .. G06F 16/2282; G06F 16/213; G06F 16/221; G06F 16/2456
See application file for complete search history.

(56) References Cited

U.S. PATENT DOCUMENTS

| | | | | |
|---|---|---|---|---|
| 7,136,868 B2* | 11/2006 | Sonkin | ...................... | G06F 8/30 |
| | | | | 707/754 |
| 9,661,109 B2* | 5/2017 | Zhang | ...................... | H04L 69/08 |
| 10,691,655 B2* | 6/2020 | Le | ........................ | G06F 16/258 |
| 2012/0078923 A1* | 3/2012 | Jain | ....................... | G06F 16/214 |
| | | | | 707/752 |
| 2018/0113848 A1* | 4/2018 | Gulwani | ............ | G06K 9/00463 |
| 2018/0113906 A1* | 4/2018 | Gulwani | ........... | G06F 16/24565 |

(Continued)

FOREIGN PATENT DOCUMENTS

JP    2003-345594    12/2003

*Primary Examiner* — Alexander Khong
(74) *Attorney, Agent, or Firm* — Fujitsu Patent Center

(57) ABSTRACT

An apparatus acquires a first input-table, based on target table information, and acquires a script for generating a first output-table from the first input-table, and a constraint condition between columns included in the first input-table and the first output-table. The apparatus converts the first input-table into a second input-table such that the second input-table obtained by converting a column structure of the first input-table and a second output-table to be obtained by converting a column structure of the target table comply with the constraint condition, and generates assignment information indicating a correspondence relationship between columns to be included in the second output-table and the target table. The apparatus generates the second output-table from the script and the second input-table, and converts the second output-table into the target table, based on the assignment information.

8 Claims, 22 Drawing Sheets

(56) References Cited

U.S. PATENT DOCUMENTS

2018/0165475 A1* 6/2018 Veeramachaneni .... G06N 7/005
2018/0218368 A1* 8/2018 Rao ...................... G06Q 20/405
2020/0117680 A1* 4/2020 Bapat ...................... G06F 9/546

* cited by examiner

FIG. 12
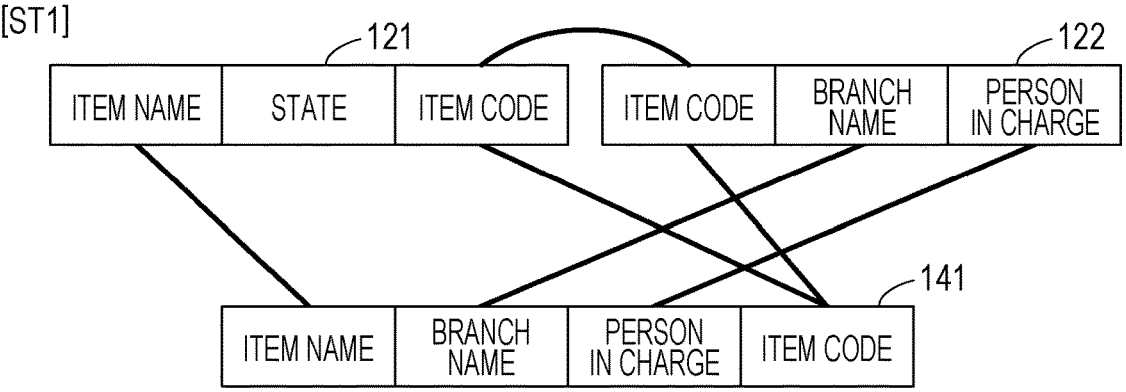
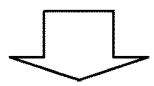
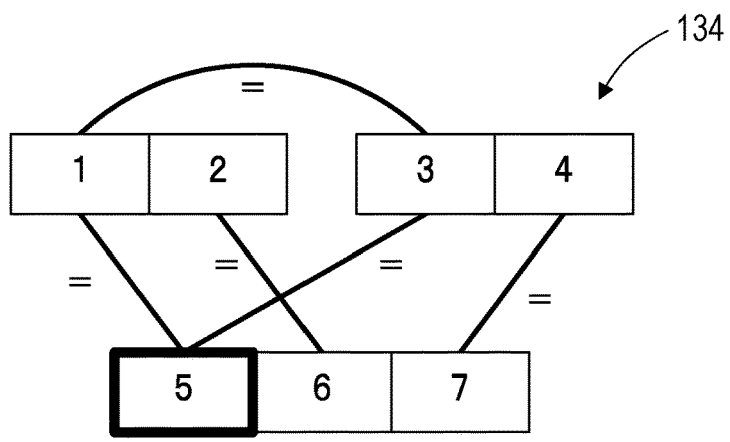
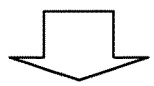
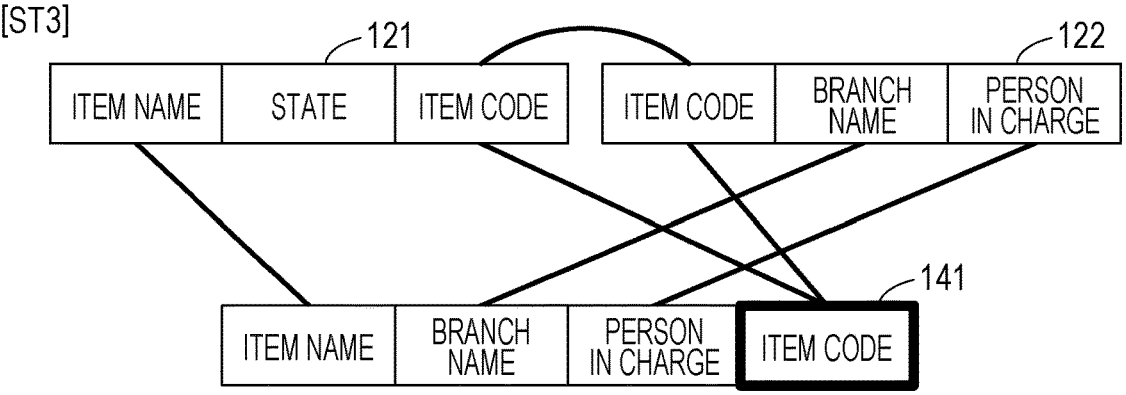
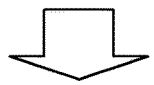

FIG. 13
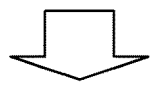
[ST4] CREATE ALL CANDIDATES FOR CONDITION SLOT 5
ITEM CODE AND "EMPTY" (CASE IN WHICH NONE IS SELECTED)
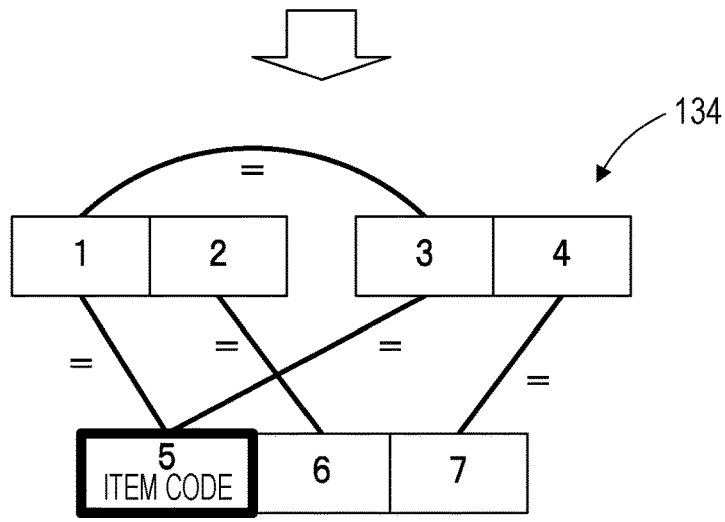
[ST5]
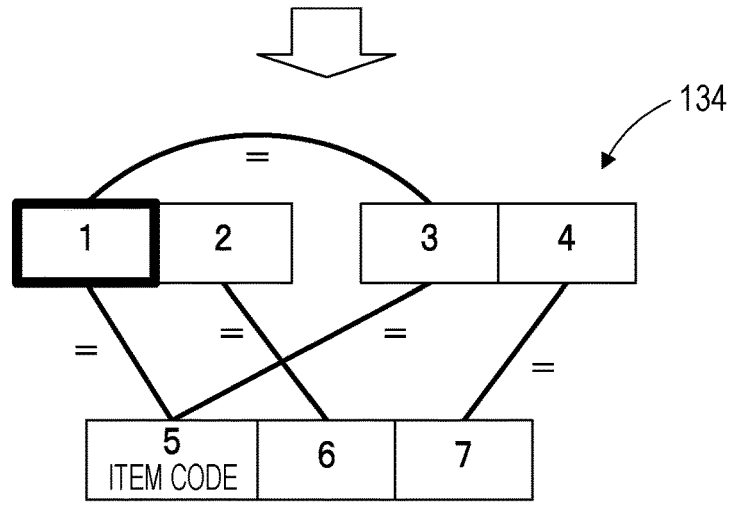
[ST6]
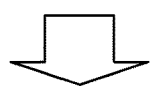

FIG. 14
[ST7]
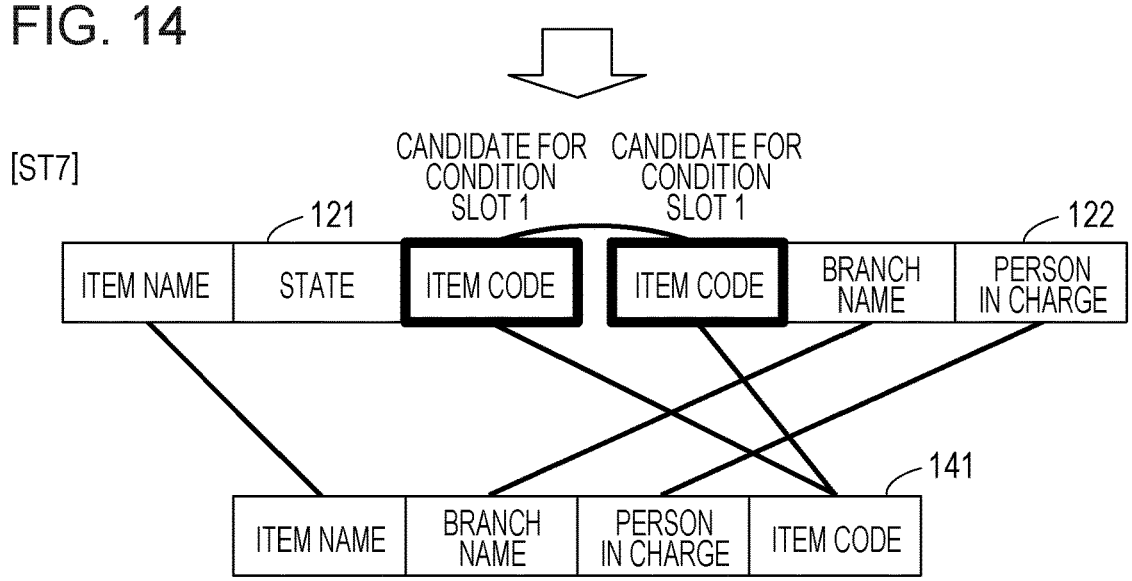
[ST8] CREATE ALL CANDIDATES FOR CONDITION SLOT 1
[ST9]
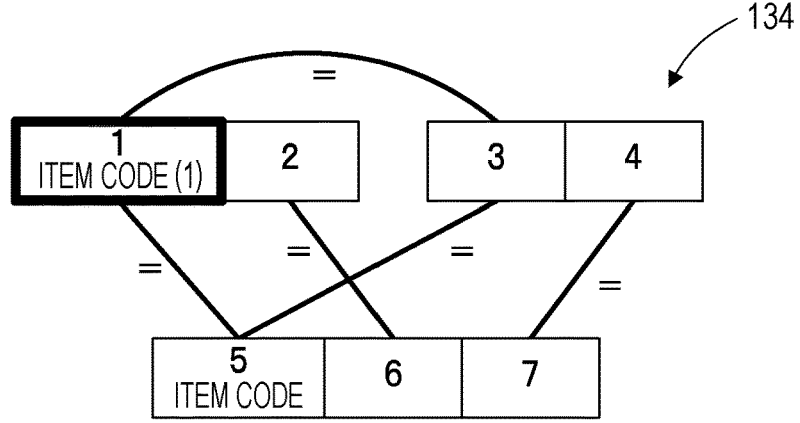

FIG. 15
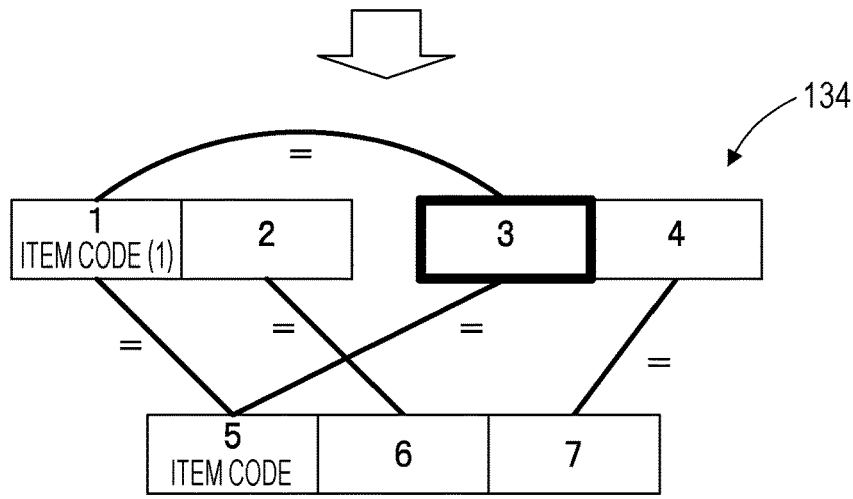
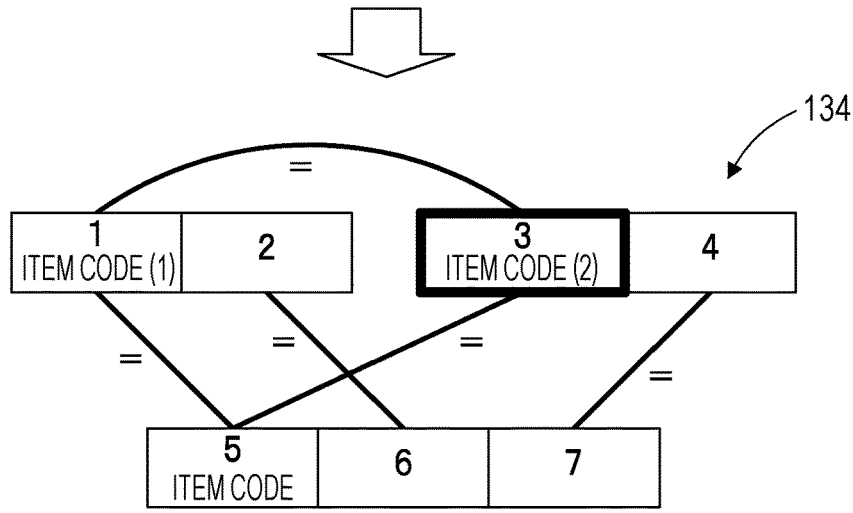
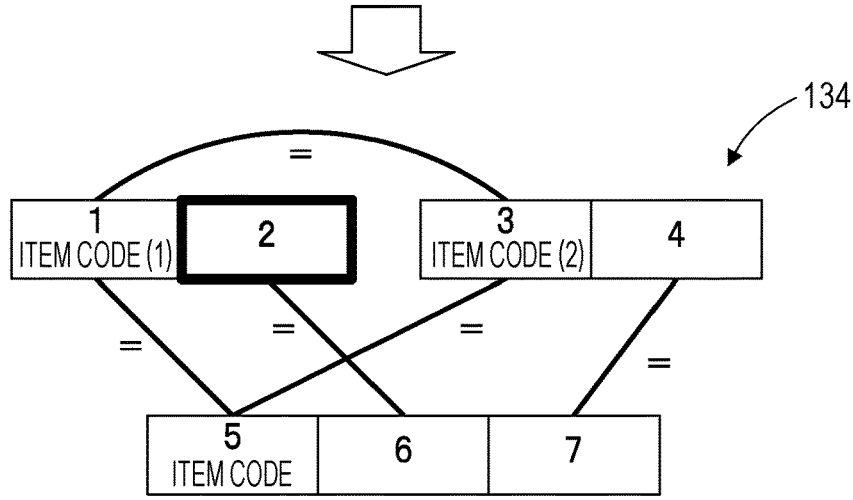

FIG. 16
[ST13]
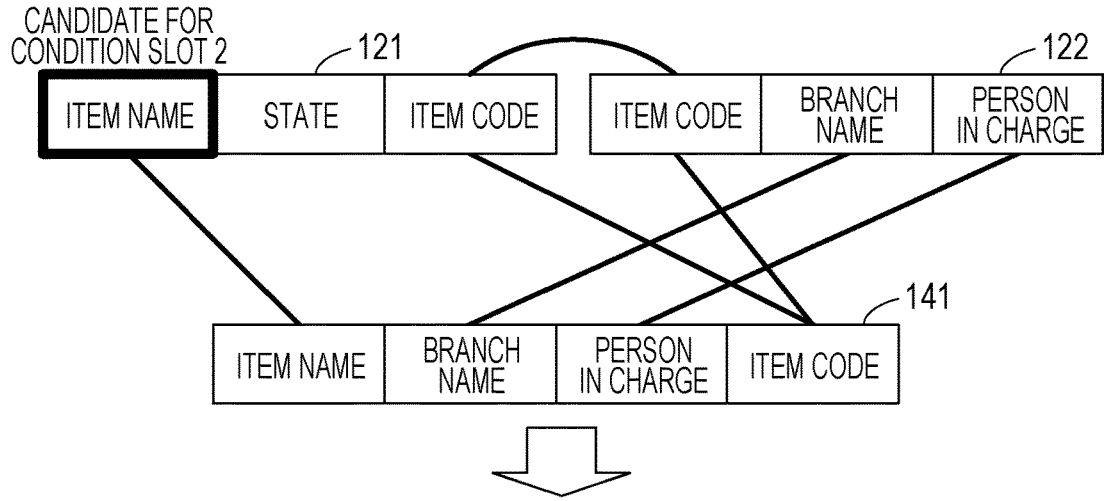
[ST14] CREATE ALL CANDIDATES FOR CONDITION SLOT 2
"EMPTY" (CASE IN WHICH NONE IS SELECTED) AND [ITEM NAME]
[ST15]
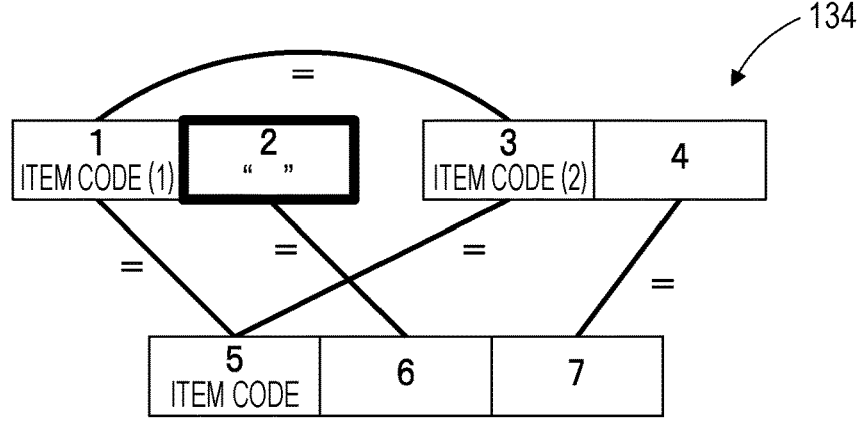

FIG. 17
[ST16]
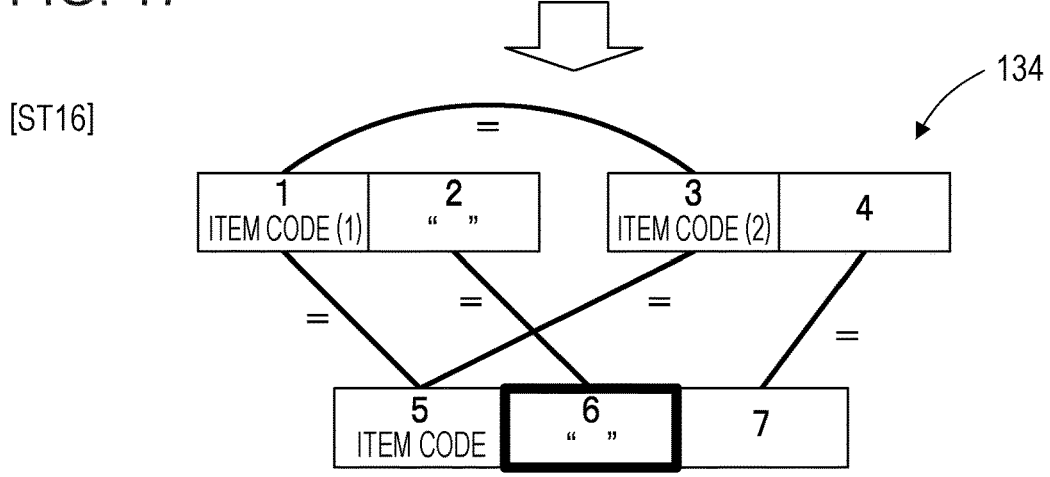
[ST17]
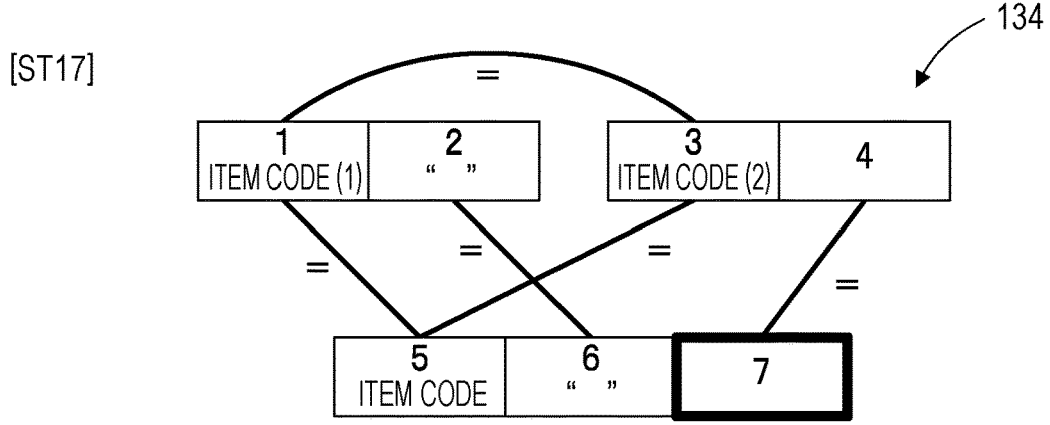
[ST18]
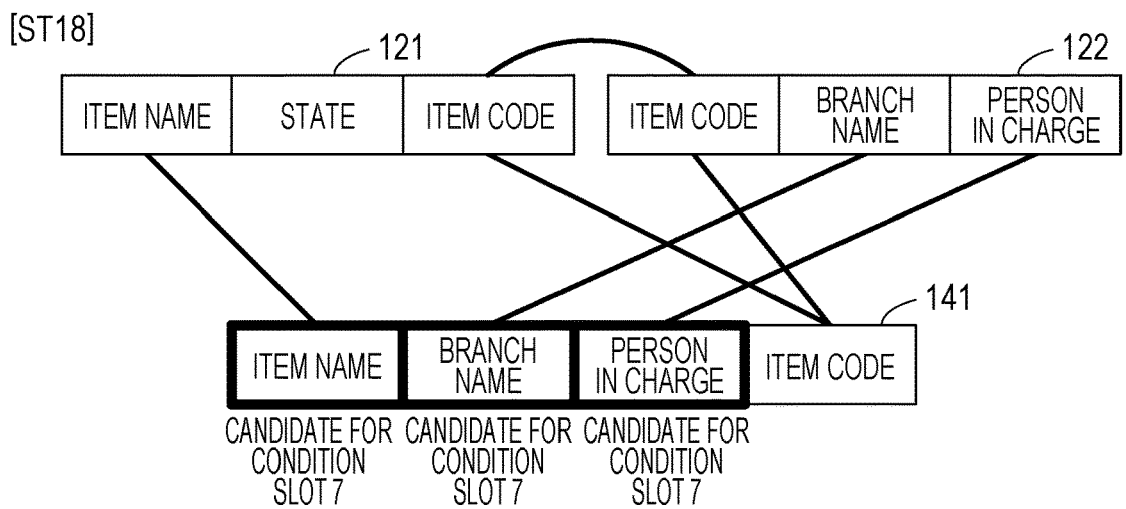

FIG. 18
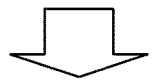
[ST19] CREATE ALL CANDIDATES FOR CONDITION SLOT 7
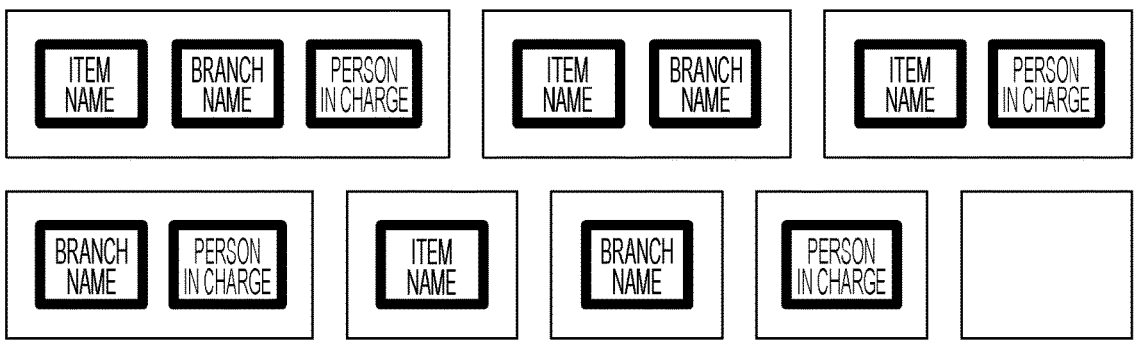
"EMPTY"
(CASE IN WHICH
NONE IS
SELECTED)
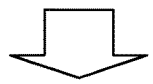
[ST20]
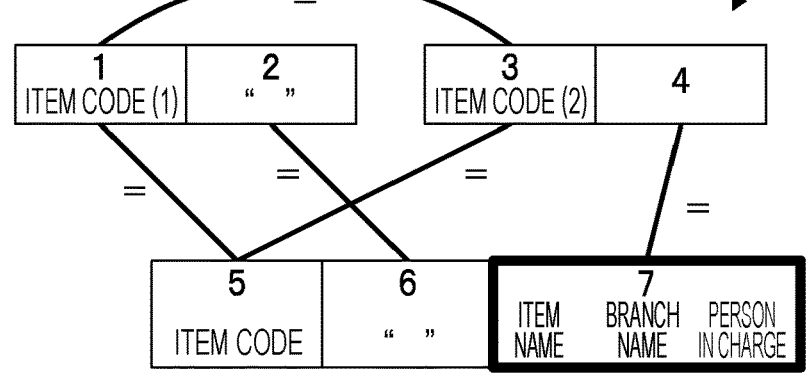
134
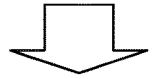
[ST21]
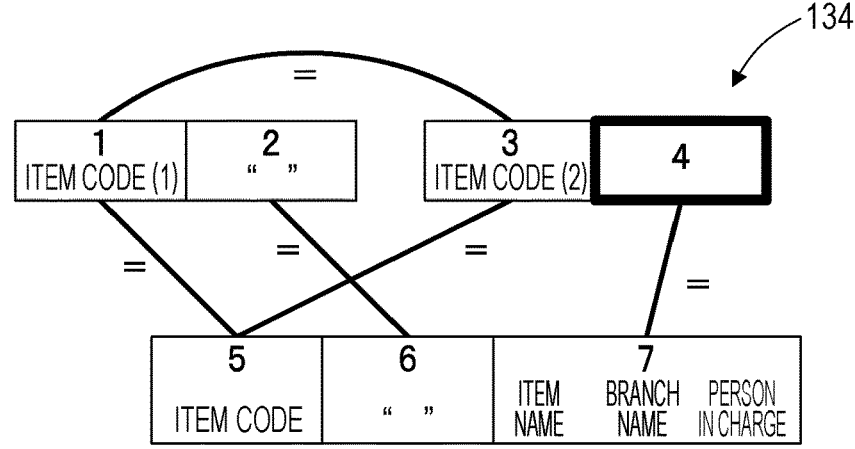
134

FIG. 19
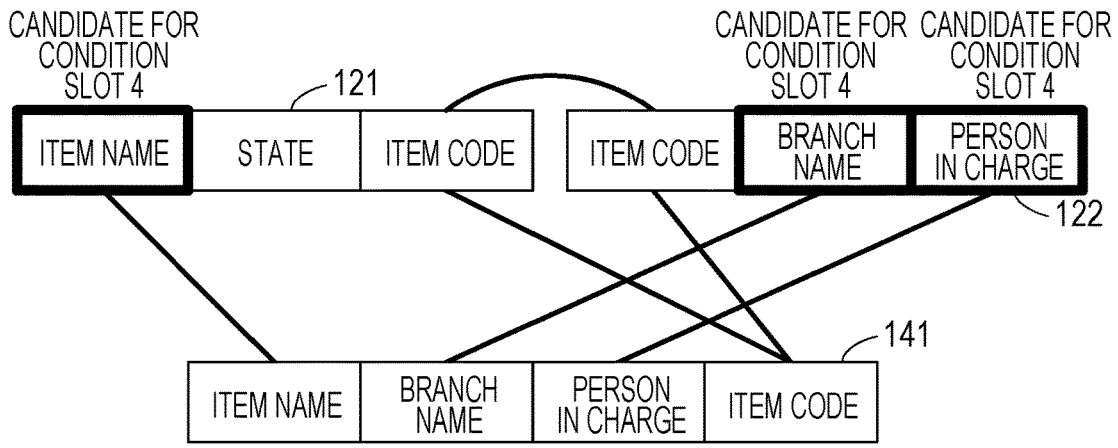
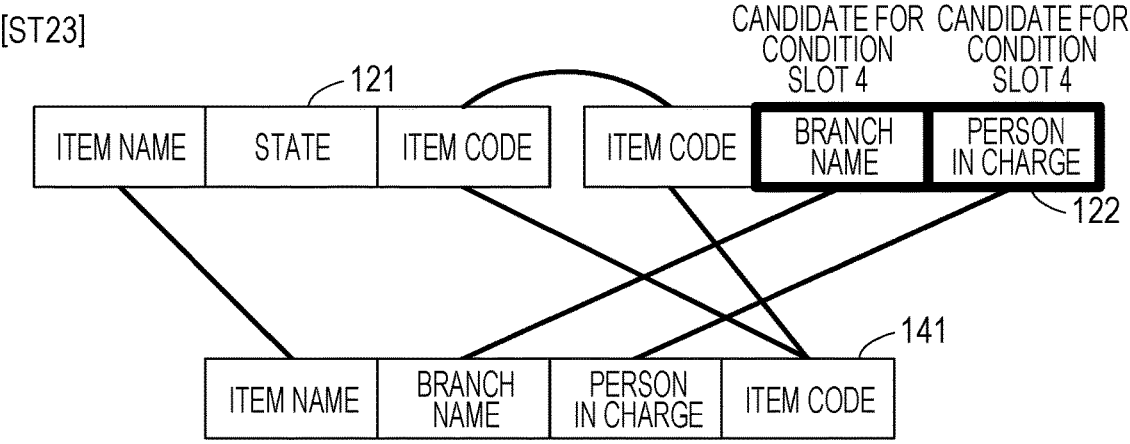
[ST24] SET OF ASSIGNED SLOTS
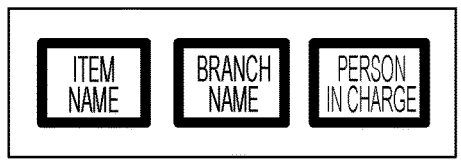

FIG. 20
[ST25]
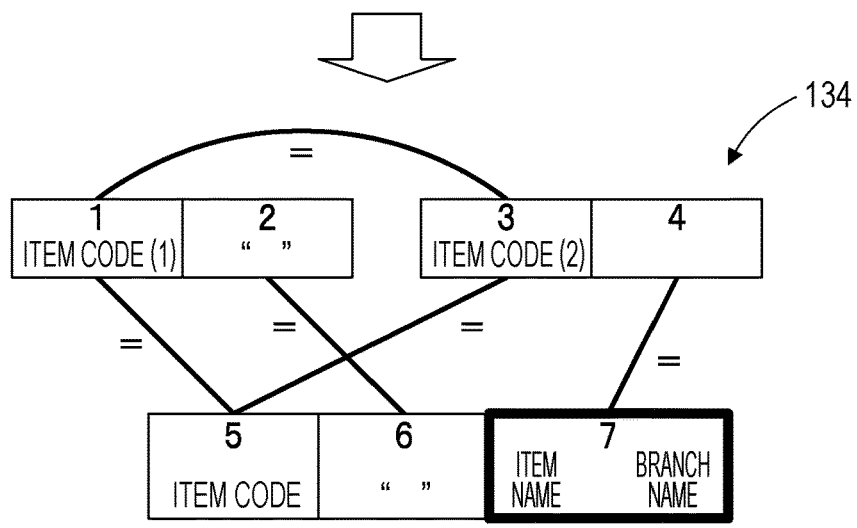
[ST26]
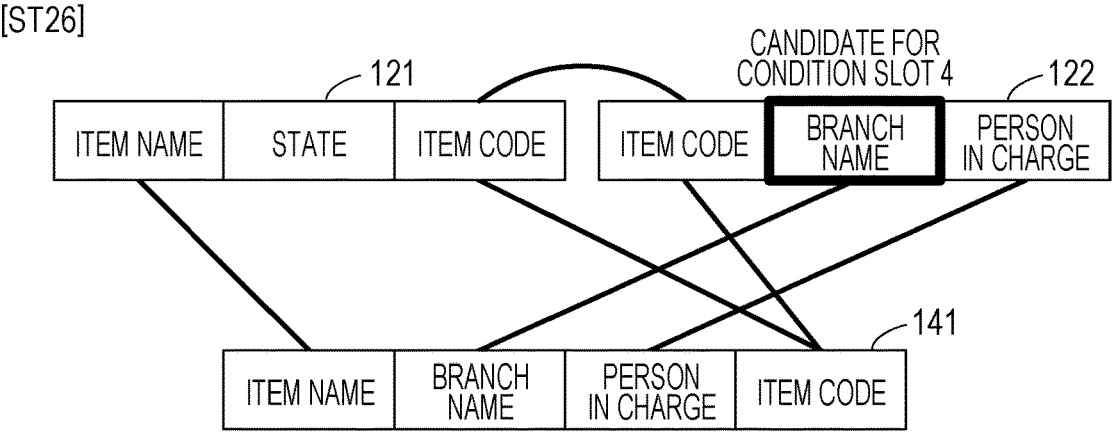
[ST27] SET OF ASSIGNED SLOTS
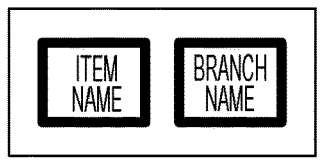

FIG. 21
[ST28]
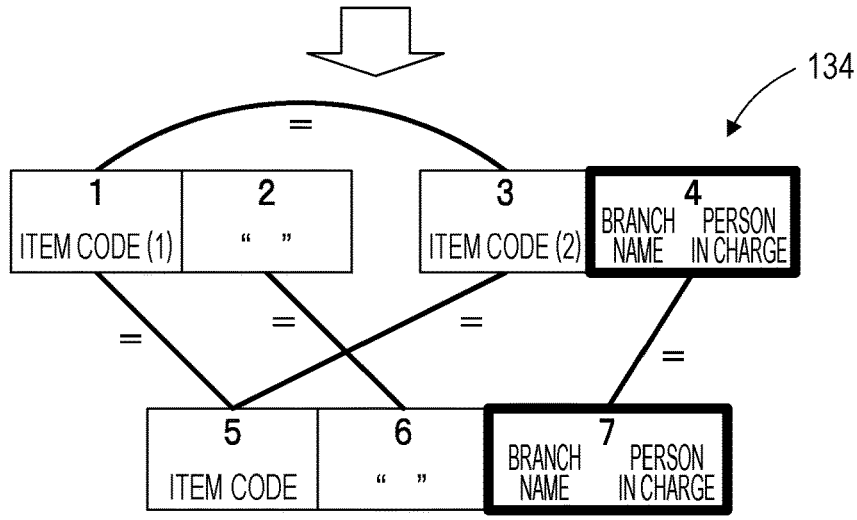
[ST29]
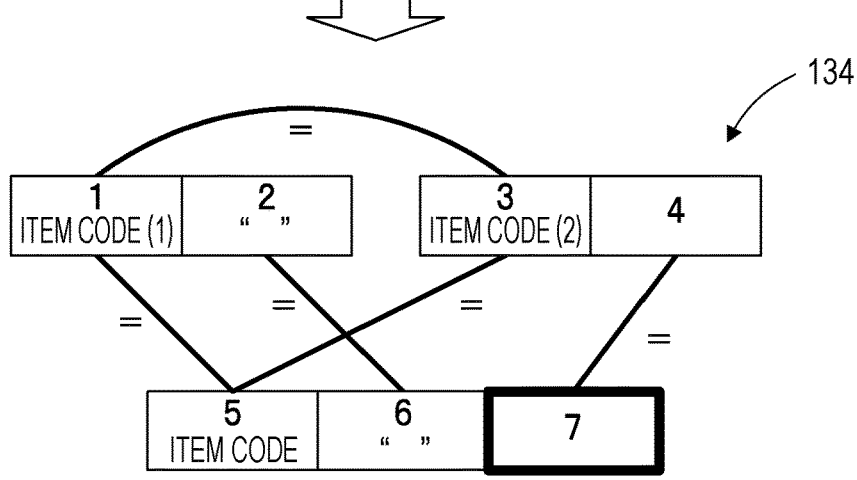
[ST30]
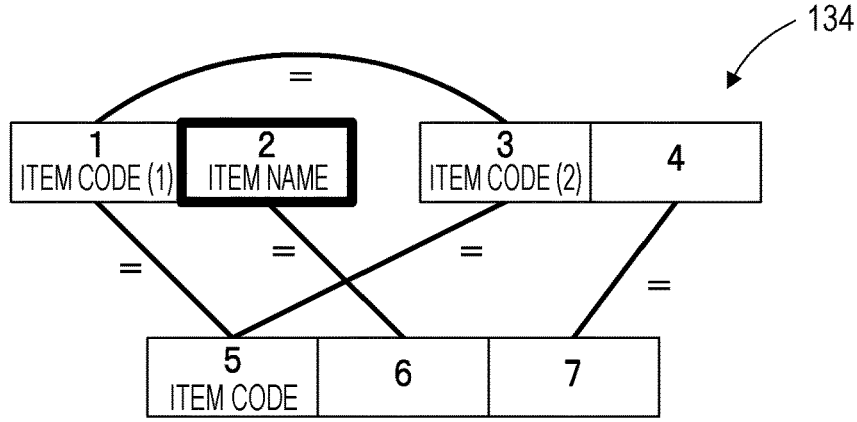

FIG. 22
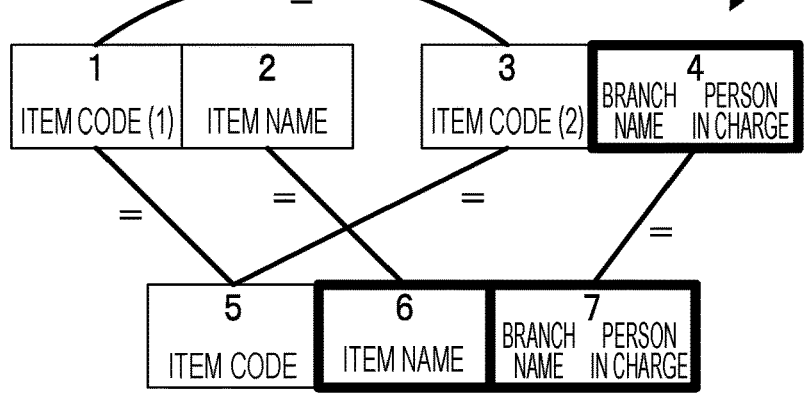
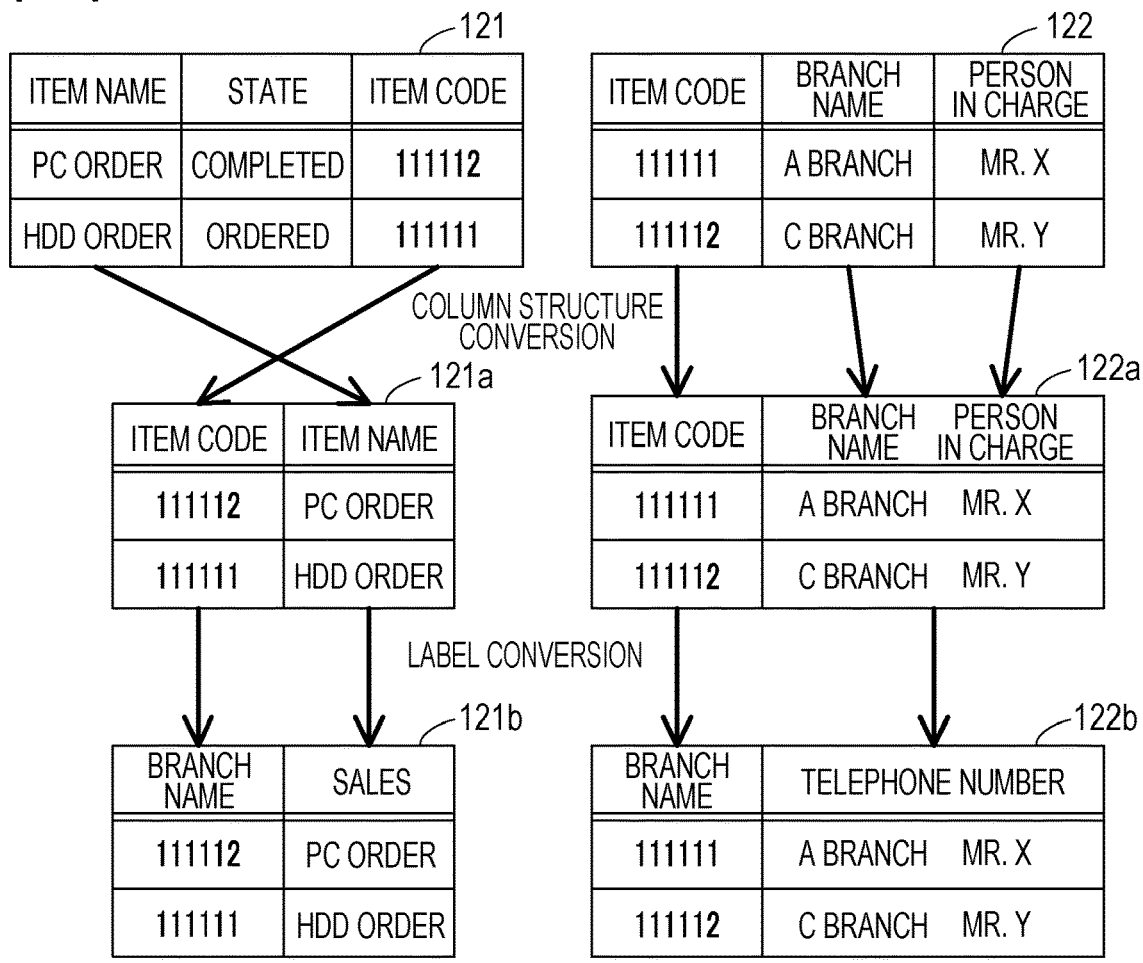

TABLE GENERATION BASED ON SCRIPTS FOR EXISTING TABLES

CROSS-REFERENCE TO RELATED APPLICATION

This application is based upon and claims the benefit of priority of the prior Japanese Patent Application No. 2018-101494, filed on May 28, 2018, the entire contents of which are incorporated herein by reference.

FIELD

The embodiments discussed herein are related to table generation based on scripts for existing tables.

BACKGROUND

Currently, various kinds of information are managed using a database (DB). For example, there is a proposal of a script file generation device which automatically generates a script for use in building a database from database design data. In this proposal, the database design data includes the size of the database to be created, the table name and the size of the table forming the database, and the item name and the size of the item included in the table. The script file generation device generates a script file for database building by describing the data included in the database design data, in a predetermined position of the macro including the template data of the script file for the database building.

Japanese Laid-open Patent Application No. 2003-345594 is example of the related art.

SUMMARY

According to an aspect of the embodiments, an apparatus acquires a first input table used for generating a target table, based on target table information indicating a column included in the target table to be generated. The apparatus acquires a script for generating a first output table from the first input table, and a constraint model indicating a constraint condition between a column included in the first input table and a column included in the first output table. The apparatus converts the first input table into a second input table such that the second input table obtained by converting a column structure of the first input table and a second output table to be obtained by converting a column structure of the target table comply with the constraint condition, and generates assignment information indicating a correspondence relationship between a column to be included in the second output table and a column included in the target table. The apparatus generates the second output table from the script and the second input table, and converts the second output table into the target table, based on the assignment information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram illustrating a specific example of table generation;

FIG. 13 is a diagram illustrating a specific example of table generation (continuation);

FIG. 14 is a diagram illustrating a specific example of table generation (continuation);

FIG. 15 is a diagram illustrating a specific example of table generation (continuation);

FIG. 16 is a diagram illustrating a specific example of table generation (continuation);

FIG. 17 is a diagram illustrating a specific example of table generation (continuation);

FIG. 18 is a diagram illustrating a specific example of table generation (continuation);

FIG. 19 is a diagram illustrating a specific example of table generation (continuation);

FIG. 20 is a diagram illustrating a specific example of table generation (continuation);

FIG. 21 is a diagram illustrating a specific example of table generation (continuation);

FIG. 22 is a diagram illustrating a specific example of table generation (continuation)

DESCRIPTION OF EMBODIMENTS

It is conceivable to reuse an existing script that generates another table from one table for generating a new table. For example, it is conceivable that the information processing apparatus applies the existing script to an existing table according to a column name of a new table as specified by the user, and generates a new table. Then, it is convenient because the user may reduce scripting work. However, existing scripts are written in accordance with a column structure of a specific table used in the initial table generation. Therefore, with respect to existing scripts, existing tables other than the specific table may not be used as input as they are in many cases and the possibility of reusing the existing scripts is low.

Hereinafter, the present embodiments will be described with reference to the drawings.

First Embodiment

A first embodiment will be described.

Figure 1:
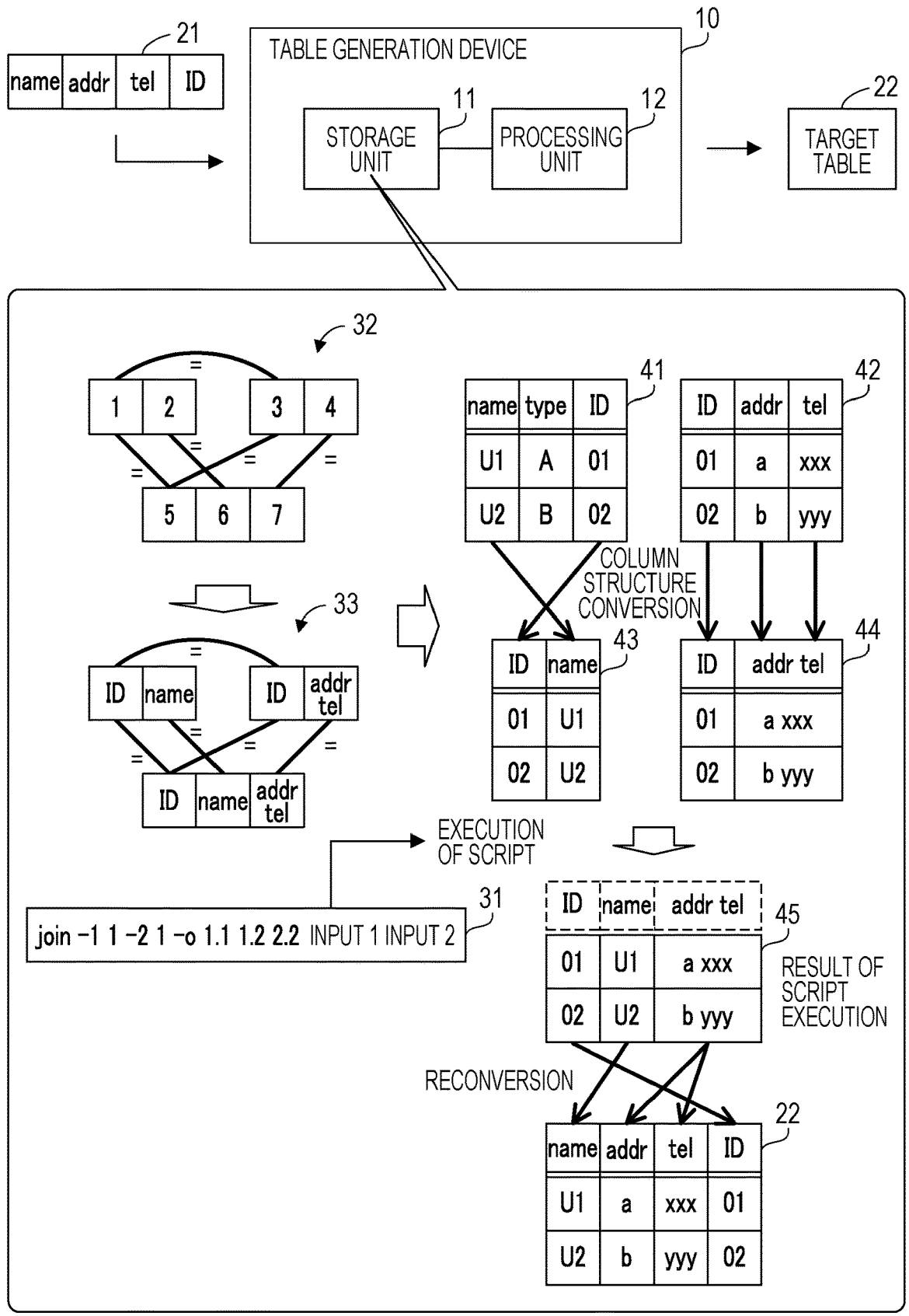
FIG. 1 is a diagram illustrating a table generation device according to a first embodiment.

FIG. 1 is a diagram illustrating a table generation device according to a first embodiment. The table generation device 10 reuses an existing script and generates a new table (target table) from an existing table.

The table generation device 10 includes a storage unit 11 and a processing unit 12. The storage unit 11 may be a volatile semiconductor memory such as a random access memory (RAM) or a nonvolatile storage such as a hard disk drive (HDD) or a flash memory. The processing unit 12 is a processor such as a central processing unit (CPU) or a digital signal processor (DSP), for example. However, the processing unit 12 may include specific-purpose electronic circuits such as application specific integrated circuit (ASIC) and field programmable gate array (FPGA). The processor executes a program stored in a memory (which may be the storage unit 11) such as a RAM. A set of plural processors may be referred to as "multiprocessor" or simply "processor".

The storage unit 11 stores an existing script, a constraint model of the existing script, and an existing table. The existing script includes a script 31. The script 31 is a command for generating a first output table from a first input table.

For example, the script 31 illustrates a script for generating an output table by a join operation of two input tables indicated by "input 1" and "input 2". Here, in the drawing, it is assumed that the leftmost column of the table is the first column, and then counted sequentially in the order of the second column, the third column, and so on to the right. The script 31 uses the attribute of the first column of a first input table indicated by "input 1" (the attribute of the first column of a second input table indicated by "input 2") as a join key to indicate that both input tables are combined. The script 31 indicates that it generates an output table in which the columns corresponding to the first and second columns of the first input table and the columns corresponding to the second column of the second input table are selected in this order from the joining result. However, the script may generate an output table from the input table by an operation other than the above (for example, a join operation in which a join key or a column to be selected is specified by a column name (attribute name), and the like). In addition, the script may generate one output table from one input table.

With respect to the script 31, the constraint model 32 indicates constraint conditions on the columns included in the first input table and columns included in the first output table. Here, one column is referred to as one "slot", and a number for identifying the slot is referred to as "slot number". Then, with respect to the script 31, each column of the first input table, the second input table, and the output table may be distinguished by the slot number. For example, in the first input table, the first column is slot number "1", and the second column is slot number "2". Further, in the second input table, the first column is the slot number "3", and the second column is the slot number "4". In addition, in the output table, the first column is slot number "5", the second column is slot number "6", and the third column is slot number "7". The constraint model 32 is represented by a graph including nodes corresponding to slots identified by the slot numbers and edges connecting the nodes. An edge indicates that column names corresponding to two nodes connected by the edge are the same.

In this example of the script 31, the column name of the first column of the first input table, the column name of the first column of the second input table, and the column name of the first column of the output table are the same. Therefore, in the constraint model 32, three nodes with slot numbers "1", "3", and "5" are connected with each other by edges. Further, in this example of the script 31, the column name of the second column of the first input table is the same as the column name of the second column of the output table. Therefore, in the constraint model 32, two nodes with slot numbers "2" and "6" are connected with each other by edges. In addition, in the example of the script 31, the column name of the second column of the second input table is the same as the column name of the third column of the output table. Therefore, in the constraint model 32, two nodes with slot numbers "4" and "7" are connected with each other by edges.

The original tables 41 and 42 are examples of existing tables stored in advance in the storage unit 11. The original table 41 includes columns of which column names are name (first column), type (second column) and IDentifier (ID) (third column). The original table 42 includes columns of which column names are ID (first column), addr (short for address) (second column) and tel (short for telephone) (third column). The existing table may be stored in a storage connected to the outside of the table generation device 10.

The processing unit 12 acquires the target table information 21 and generates a target table 22. The target table information 21 indicates a column included in the target table 22 to be newly generated. For example, the target table information 21 includes information indicating a column name of each column of the target table 22 and an arrangement order of each column. When the target table information 21 is input, the processing unit 12 acquires a script, a constraint model on the script, and an original table used for generating the target table 22. The processing unit 12 selects a combination of original tables including all column names included in the target table information 21 from the existing tables.

The processing unit 12 converts the original table into the second input table such that the second input table obtained by converting the column structure of the original table and the second output table obtained by converting the column structure of the target table satisfy the constraint condition. At the same time, the processing unit 12 generates assignment information indicating the correspondence relationship between the columns included in the second output table and the columns included in the target table.

Here, the conversion from the original table into the second input table includes at least one of changing the column name and changing the column order of a column included in the original table. In addition, the conversion from the original table into the second input table may include integrating two or more columns included in the original table into one column. In this case, the conversion from the second output table into the target table includes dividing one column included in the second output table into two or more columns.

For example, in the target table information 21, it is assumed that columns of name, addr, tel and ID are specified in this arrangement order. Further, the processing unit 12 acquires the original tables 41 and 42 for the target table information 21. In addition, the processing unit 12 acquires the script 31 and the constraint model 32.

Then, the processing unit 12 converts the original table 41 and 42 into the second input table such that the second input table obtained by converting the column structure of the original table 41 and 42 and the second output table obtained by converting the column structure of the target table 22 satisfy the constraint condition. Table 43 is a second input table obtained by converting the column structure of the original table 41. In addition, table 44 is a second input table obtained by converting the column structure of the original table 42. Further, table 45 is a second output table obtained by converting the column structure of the target table 22 indicated by the target table information 21 (however, at this stage, table 45 is not generated).

For example, in the table 43, the columns of ID and name are selected from the original table 41, and the column order is changed such that the first column is ID and the second column is name. The column structure of the table 43 corresponds to the slot numbers "1" and "2" of the constraint model 32. In addition, in the table 44, the columns of ID, addr, and tel are selected from the original table 42, and the columns of addr and tel are integrated into one column (the column name is "addr tel" and the values of the two original columns are separated by spaces to form a single value). The column structure of the table 44 corresponds to the slot numbers "4" and "5" of the constraint model 32. In addition, in the table 45, the columns of addr and tel among the columns of the target table 22 indicated by the target table information 21 are integrated into one column, and the column order is changed such that the first column is ID, the second column is name, and the third column is addr tel. The method of column integration in the table 45 is the same as the method of column integration in the table 44. The column structure of the table 45 corresponds to the slot numbers "5", "6", and "7" of the constraint model 32.

The processing unit 12 assigns a column of ID to each slot of the slot numbers "1", "3", and "5" in the constraint model 32. In addition, the processing unit 12 assigns a column of name to each slot of slot numbers "2" and "6". Further, the processing unit 12 assigns a column of addr tel to each slot of slot numbers "4" and "7". The assignment information 33 illustrates the result of these assignments.

In this manner, the processing unit 12 converts the original tables 41 and 42 into the tables 43 and 44 such that the constraint condition indicated by the constraint model 32 is satisfied. In addition, the processing unit 12 generates assignment information 33 indicating a result of assigning the attributes to each slot in the constraint model 32, and stores the assignment information 33 in the storage unit 11. The slots corresponding to the slot numbers "5", "6", and "7" of the assignment information 33 indicate the result obtained by converting the column structure of the target table 22 indicated by the target table information 21. Therefore, it may be said that the assignment information 33 is information indicating the correspondence relationship between the columns included in the second output table (table 45) and the columns included in the target table 22.

The processing unit 12 generates a second output table from the script and the second input table and converts the second output table into a target table based on the assignment information. For example, the processing unit 12 generates the table 45 from the script 31 and the tables 43 and 44 and converts the table 45 into the target table 22 based on the assignment information 33. When the script 31 is executed with the tables 43 and 44 as input, the table 45 is obtained. The column name may not be assigned to the table 45. The processing unit 12 reconverts the table 45 to obtain the target table 22.

For example, according to the assignment information 33, in the table 45, the first column is ID, the second column is name, and the third column is addr tel. Therefore, the processing unit 12 shuffles the second column of the table 45 as the first column, the value at a front side of the space in the third column of the table 45 as the second column, the value at a rear side of the space as the third column, and the first column of the table 45 as the fourth column and assign the column names as indicated by the target table information 21. In this way, the processing unit 12 obtains the target table 22 by reconverting the table 45.

The table generation device 10 acquires a script for generating a first output table from a first input table, a constraint model indicating a constraint condition between a column included in the first input table and a column included in the first output table, target table information indicating a column included in a target table to be generated, and an original table used for generating the target table. The original table is converted into a second input table and assignment information indicating a correspondence relationship between a column included in a second output table and a column included in the target table is generated such that the second input table obtained by converting the column structure of the original table and the second output table obtained by converting the column structure of the target table satisfy the constraint condition. The second output table is generated from the script and the second input table and the second output table is converted into the target table based on the assignment information.

As a result, reuse of the existing scripts is facilitated. For example, as illustrated in the script 31, the existing scripts are written in accordance with the column structure of a specific table. Therefore, the existing scripts may not be reused in other tables when there is a discrepancy between the tables other than the specific table and the column structure that is assumed by the existing script (for example, when column order, column name and number of columns is different). Therefore, when a new table is generated using another input table, the possibility of reusing existing scripts is low.

Therefore, the table generation device 10 converts the column structure of the original table according to the constraint model 32 related to the input and output table attached to the existing script, inputs the same, and reconverts the obtained column structure of the output table into the target structure, thus facilitating the reuse existing scripts. Therefore, by inputting the target table information 21 indicating the columns included in the target table 22 to the table generation device 10, a user may have the table generation device 10 generate the target table 22 without having to write a new script.

Second Embodiment

Figure 2:
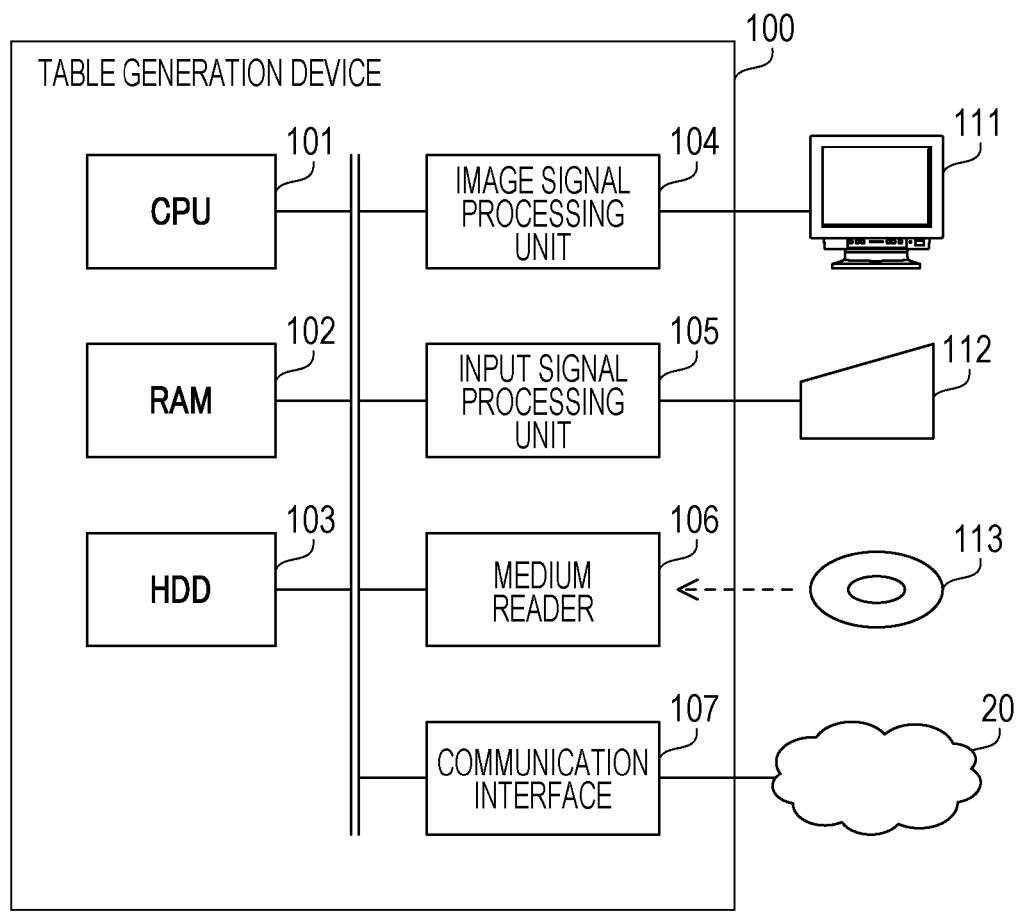
FIG. 2 is a block diagram illustrating an example of hardware of a table generation device according to a second embodiment.

Next, a second embodiment will be described. FIG. 2 is a block diagram illustrating an example of hardware of a table generation device according to a second embodiment.

The table generation device 100 includes a CPU 101, a RAM 102, an HDD 103, an image signal processing unit 104, an input signal processing unit 105, a medium reader 106, and a communication interface 107. The CPU 101 corresponds to the processing unit 12 of the first embodiment. The RAM 102 or the HDD 103 corresponds to the storage unit 11 of the first embodiment.

The CPU 101 is a processor that executes instructions of a program. The CPU 101 loads at least a part of the program and data stored in the HDD 103 into the RAM 102 and executes the program. The CPU 101 may include a plurality of processor cores. In addition, the table generation device 100 may include a plurality of processors. The processing described below may be executed in parallel by using a plurality of processors or processor cores. In addition, a set of plural processors may be referred to as "multiprocessor" or simply "processor".

The RAM 102 is a volatile semiconductor memory that temporarily stores programs executed by the CPU 101 and data used by the CPU 101 for calculation. The table generation device 100 may include other types of memory than the RAM, or may include a plurality of memories.

The HDD 103 is a nonvolatile storage device that stores software programs such as operating system (OS), middleware, and application software, and data. The table generation device 100 may include another type of storage device such as a flash memory or a solid state drive (SSD), or may include a plurality of nonvolatile storage devices.

In accordance with an instruction from the CPU 101, the image signal processing unit 104 outputs an image to the display 111 connected to the table generation device 100. As the display 111, any type of display such as a cathode ray tube (CRT) display, a liquid crystal display (LCD), a plasma display, an organic electro-luminescence (OEL) display, and the like may be used.

The input signal processing unit 105 acquires an input signal from the input device 112 connected to the table generation device 100, and outputs the input signal to the CPU 101. As the input device 112, a pointing device such as a mouse, a touch panel, a touch pad, a track ball, and the like, a keyboard, a remote controller, a button switch, and the like may be used. In addition, a plurality of types of input devices may be connected to the table generation device 100.

The medium reader 106 is a reading device that reads a program and data recorded on the recording medium 113. As the recording medium 113, for example, a magnetic disk, an optical disk, a magneto-optical disk (MOD), a semiconductor memory, and the like may be used. The magnetic disk includes a flexible disk (FD) and an HDD. The optical disk includes compact disc (CD) and digital versatile disc (DVD).

The medium reader 106 copies a program or data read from the recording medium 113 onto another recording medium such as the RAM 102 or the HDD 103, for example. The read program is executed by the CPU 101, for example. The recording medium 113 may be a portable recording medium, and may be used for distribution of programs and data. In addition, the recording medium 113 and the HDD 103 may be referred to as a computer-readable recording medium.

The communication interface 107 is an interface that is connected to the network 20 and communicates with other computers through the network 20. The communication interface 107 is connected to a communication device such as a switch, a router, and the like by a cable, for example.

Figure 3:
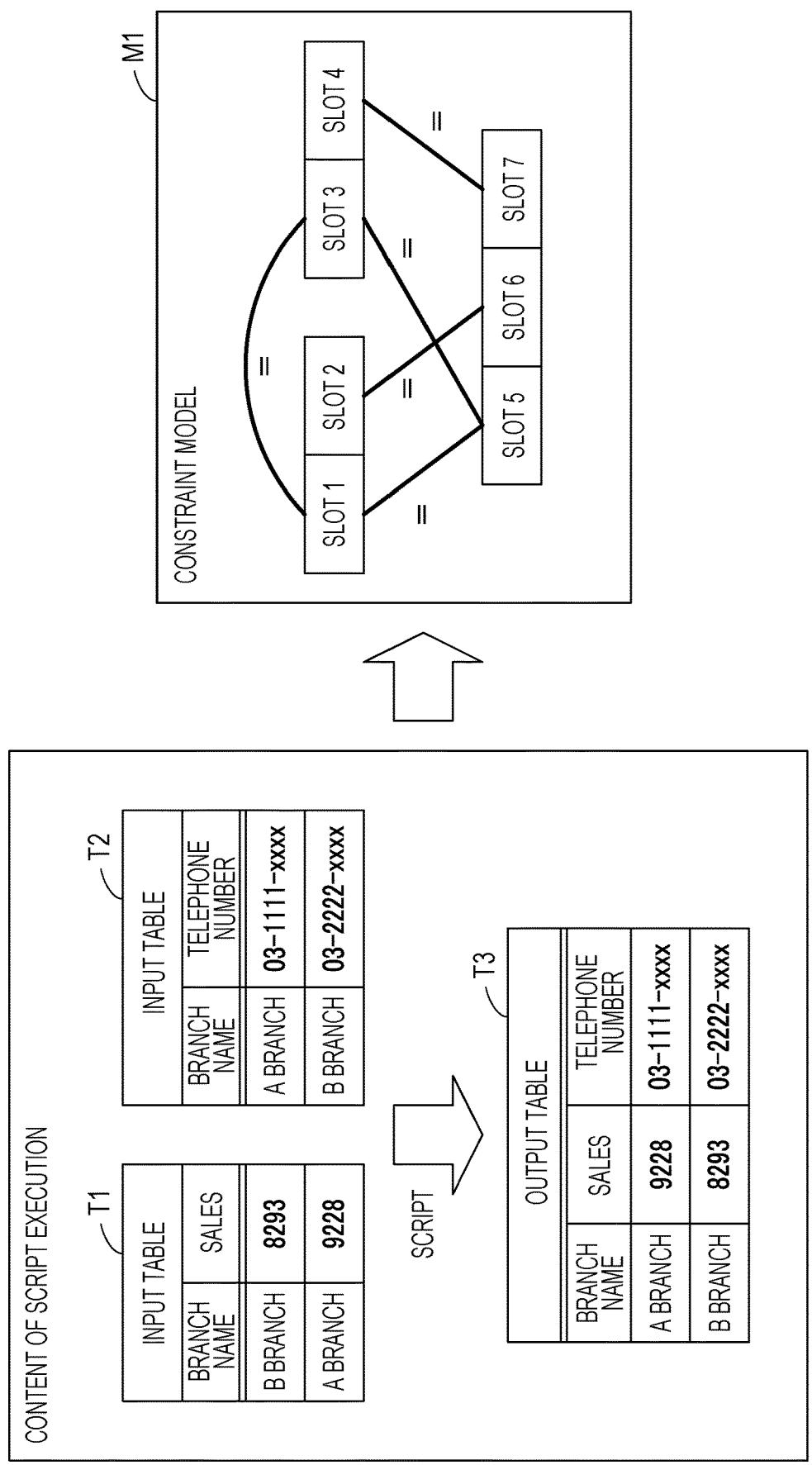
FIG. 3 is a diagram illustrating a relationship between a script and a constraint model.

FIG. 3 is a diagram illustrating a relationship between a script and a constraint model. Consider a script outputting the output table T3 with the input tables T1 and T2 as input. As an example, a script for generating the output table T3 by a join operation on the input tables T1 and T2 is conceivable. Here, in the following description, the column name (attribute name) in each table may be referred to as a label. In addition, the columns in each table may be referred to as slots.

The labels included in the input table T1 are "branch name" and "sales". The labels included in the input table T2 are "branch name" and "telephone number". The labels of the output table T3 are "branch name", "sales" and "telephone number".

In this case, the table generation device 100 may obtain the constraint model M1 representing the constraint condition for reusing the script from the relationship of each label of the input tables T1, T2 and the output table T3. For example, two slots of the input table T1 are "slot 1" and "slot 2". Two slots of the input table T2 are "slot 3" and "slot 4". Three slots of the output table T3 are "slot 5", "slot 6", and "slot 7". For example, the information of the constraint model M1 is represented by a graph in which one slot is a node, and the relationship between two nodes having matching labels is an edge connecting the two nodes.

The constraint model M1 includes three constraints. The first constraint is that labels (for example, "branch name") of slots 1, 3, and 5 match. The second constraint is that the labels (for example, "sales") of slots 2 and 6 match. The third constraint is that the labels (for example, "telephone number") of the slots 4, 7 match. When the input and output tables satisfy these three constraints, there is a possibility that the script may be reused for generation of the other output tables.

The table generation device 100 stores a plurality of scripts in advance. In addition, the table generation device 100 stores in advance the constraint model of each script in association with each script. The table generation device 100 provides a function of reusing a plurality of scripts and automatically generating a table having a column structure input by the user (sometimes referred to as a target table).

Figure 4:
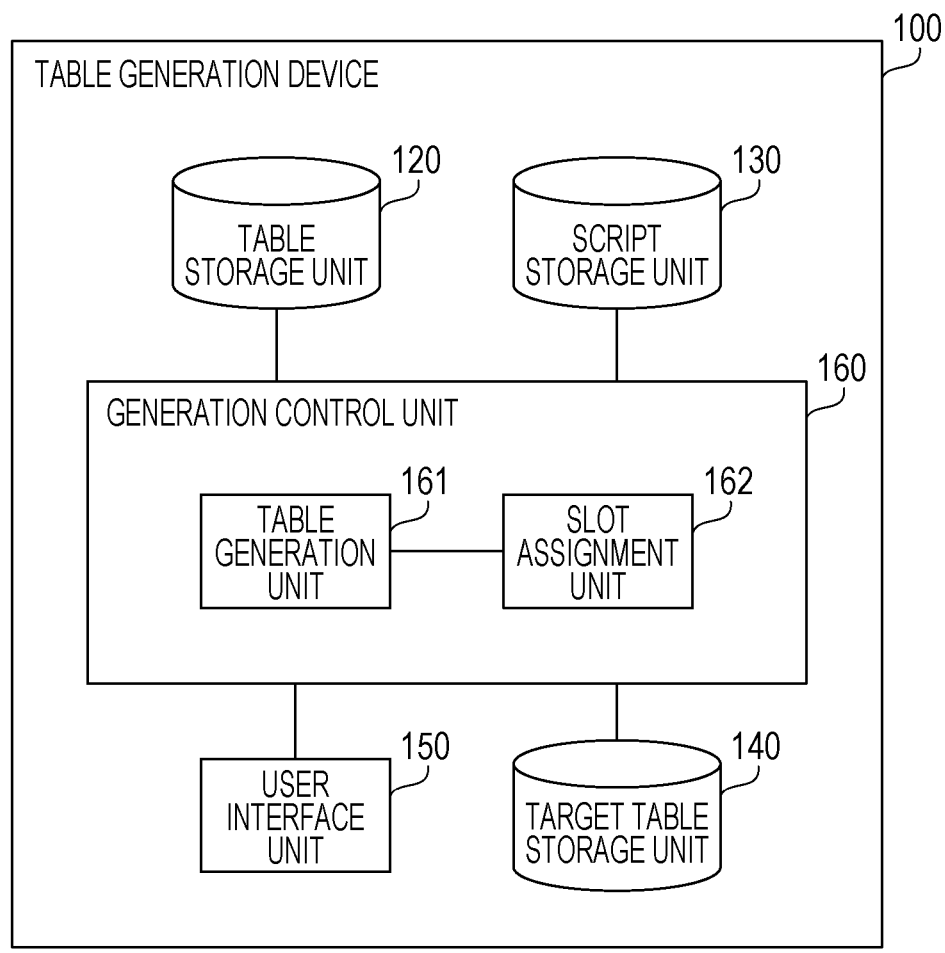
FIG. 4 is a block diagram illustrating an example of a function of a table generation device.

FIG. 4 is a block diagram illustrating an example of a function of a table generation device. The table generation device 100 includes a table storage unit 120, a script storage unit 130, a target table storage unit 140, a user interface (UI) unit 150, and a generation control unit 160. The table storage unit 120, the script storage unit 130, and the target table storage unit 140 are realized by using the storage area of the RAM 102 or the HDD 103. The UI unit 150 and the generation control unit 160 are realized by executing the program stored in the RAM 102 by the CPU 101.

The table storage unit 120 stores a plurality of tables in advance. The table storage unit 120 is a relational database (RDB), for example. The existing tables stored in the table storage unit 120 are candidates for a table from which the target table is generated. Here, the table of the generation source of the target table is referred to as an original table.

The script storage unit 130 stores in advance a plurality of scripts and information of the constraint model corresponding to each of the plurality of scripts. One constraint model is associated with one script. Examples of script writing method include a label type (for example, structured query language (SQL)) that describes operation content by specifying a label, a slot position type that describes operation content by specifying a column number, and the like, for example.

The target table storage unit 140 stores target table information indicating a column of a target table. The target table information is input by the user. In addition, the target table storage unit 140 stores the target table generated by the generation control unit 160.

The UI unit 150 receives input of the target table information by the user. In addition, the UI unit 150 causes the display 111 to display the target table generated by the generation control unit 160 based on the target table information.

The generation control unit 160 acquires the target table information from the UI unit 150 and stores the target table information in the target table storage unit 140. The generation control unit 160 generates a target table according to the target table information and stores the target table in the table storage unit 120. The generation control unit 160 includes a table generation unit 161 and a slot assignment unit 162.

The table generation unit 161 selects the original table from the table storage unit 120 based on the target table information. The table generation unit 161 requests the slot assignment unit 162 to select a script according to the original table and the target table information. The table generation unit 161 converts the column structure of the original table according to the script selected by the slot assignment unit 162, and executes the script with the converted original table as an input. The table generation unit 161 reconverts the column structure of the table obtained as the execution result of the script in accordance with the target table information, so that the target table is generated and the target table is stored in the target table storage unit 140.

The slot assignment unit 162 performs assignment processing of assigning each label included in the original table and the target table information to each slot in the constraint model of the script and confirms whether the script may be used for generation of the target table this time. When performing assignment processing sequentially for each script, and specifying a usable script, the slot assignment unit 162 provides the table generation unit 161 with information indicating the script and assignment information indicating the assignment result. The assignment information is stored in the script storage unit 130 and used for generating a target table from the execution result of the script.

Figure 5:
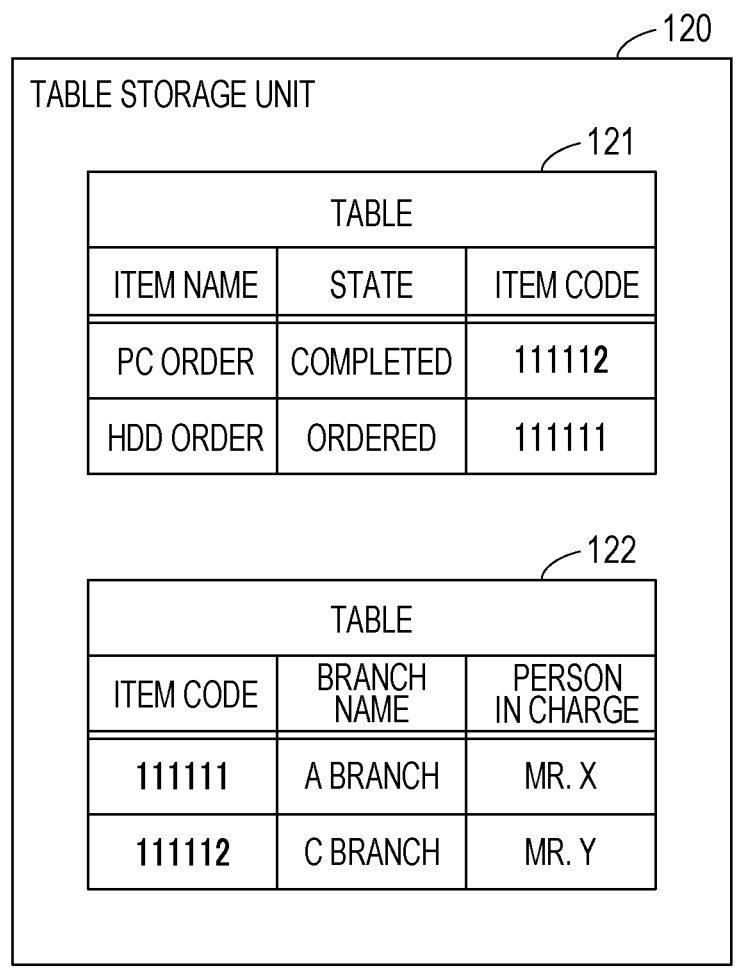
FIG. 5 is a diagram illustrating an example of an original table.

FIG. 5 is a diagram illustrating an example of an original table.

The tables 121 and 122 are examples of the original tables stored in the table storage unit 120. The table 121 includes three columns indicated by the labels of item name, state, and item code. The table 121 includes records (rows) of item name "PC order", state "completed", and item code "111112". The table 121 includes records of item name "HDD order", state "ordered", and item code "111111".

The table 122 includes three columns indicated by the labels of item code, branch name and person in charge. The table 122 includes records of item code "111111", branch name "A branch", and person in charge "Mr. X". The table 122 includes records of item code "111112", branch name "C branch", and person in charge "Mr. Y".

Figure 6A:
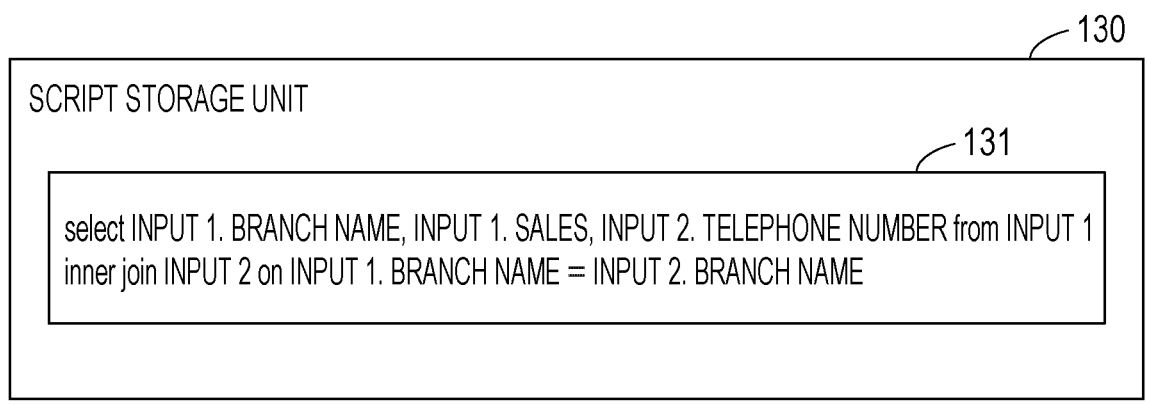
FIGS. 6A and 6B are diagrams illustrating an example of a script.
Figure 6B:
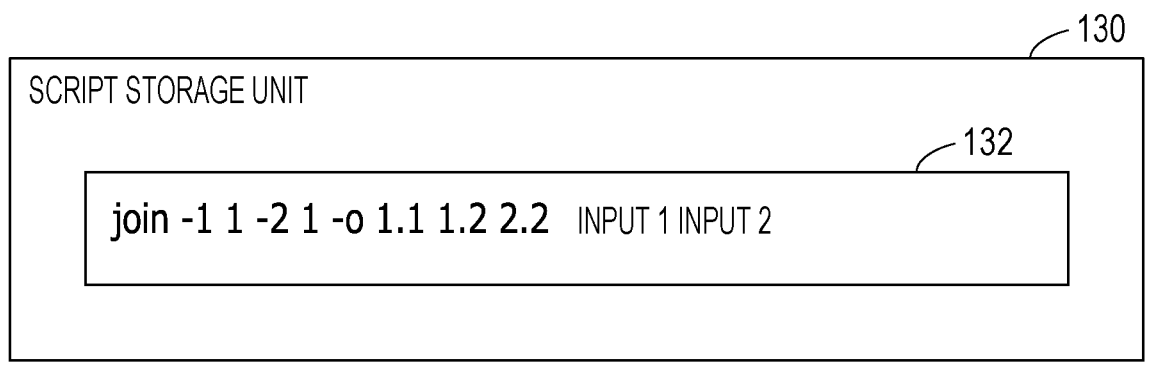

The tables other than the tables 121 and 122 are also stored in the table storage unit 120 in advance. FIGS. 6A and 6B are diagrams illustrating an example of a script.

FIG. 6A illustrates an example of a label type script. The script 131 is a label type script for generating the output table T3 from the input tables T1 and T2 illustrated in FIG. 3. The script 131 obtains the output table T3 by the join operation of the input table T1 ("input 1") and the input table T2 ("input 2").

FIG. 6B illustrates an example of a slot position type script. The script 132 is a slot position type script for generating the output table T3 from the input tables T1 and T2 illustrated in FIG. 3. Likewise the script 131, the script 132 obtains the output table T3 by the join operation of the input table T1 ("input 1") and the input table T2 ("input 2"). In the slot position type, a column to serve as a join key and a column to be selected are specified by a column number counted from the front (from the left end in the drawing) of each table.

In this manner, the script may be described in the label type or the slot position type. In addition, the scripts other than the scripts 131, 132 are also stored in the script storage unit 130 in advance.

Figure 7:
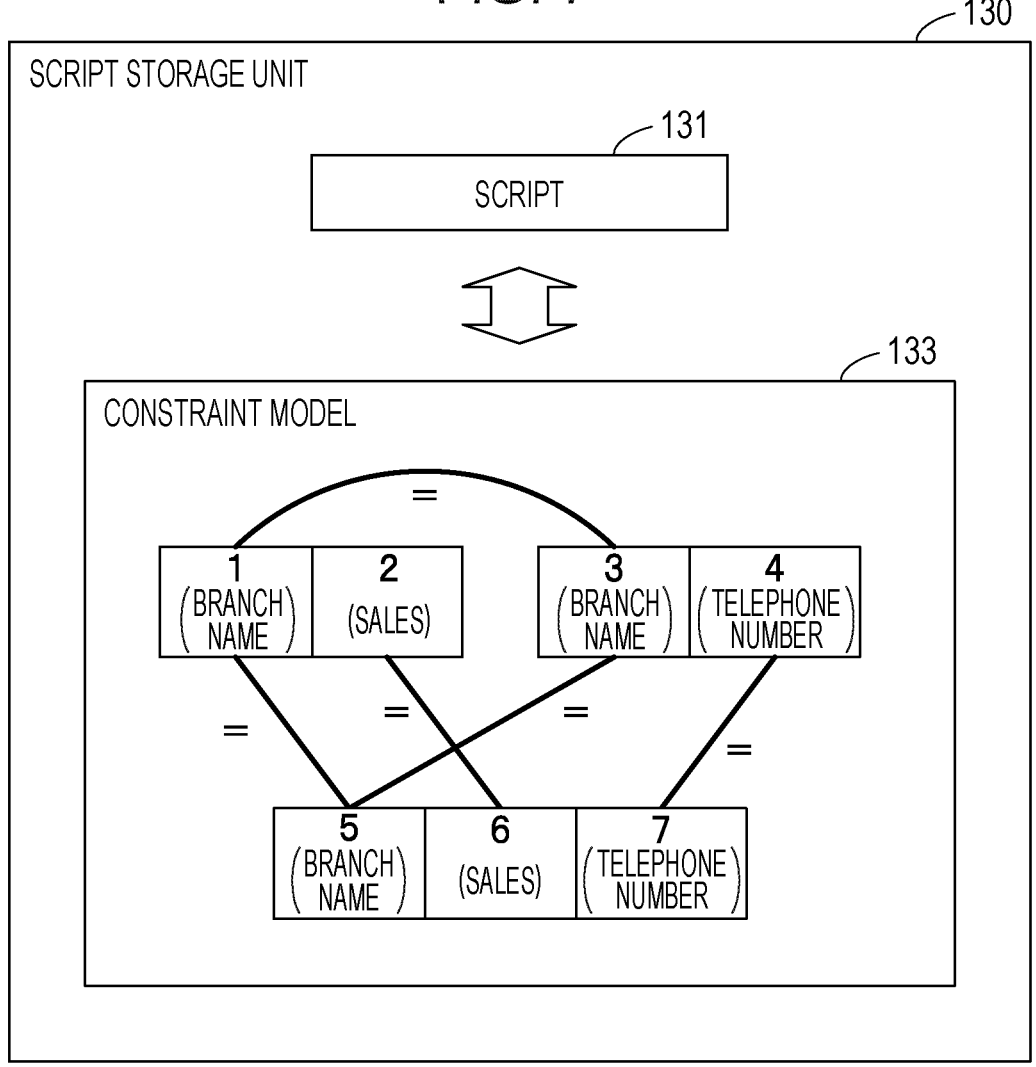
FIG. 7 is a diagram illustrating an example of a constraint model.

FIG. 7 is a diagram illustrating an example of a constraint model. The constraint model 133 illustrates a constraint model of the script 131. The graph structure of the constraint model 133 is similar to the constraint model M1 exemplified in FIG. 3 (the constraint model of the script 132 is also the same as the constraint model M1). The slot number of each slot in the constraint model 133 is assumed to be the same as the slot number of each slot in the constraint model M1.

The constraint model 133 illustrates that labels of slots 1, 3, and 5 match, labels of slots 2 and 6 match, and labels of slots 4 and 7 match. In addition, the constraint model 133 holds information on the labels of each slot. The label of slot 1 is "branch name". The label of slot 2 is "sales". The label of slot 3 is "branch name". The label of slot 4 is "telephone number". The label of slot 5 is "branch name". The label of slot 6 is "sales". The label of the slot 7 is "telephone number".

Here, the script 132 is the slot position type. Therefore, the constraint model of the script 132 holds no label. Therefore, the generation control unit 160 may distinguish whether the description method of the script corresponding to the constraint model is the label type or the slot position type based on whether or not the constraint model holds the label.

Although an example using a join operation has been exemplified as a script, the script may generate an output table by an operation other than the join operation. For example, the script may obtain a statistical value (for example, average value) of the values of predetermined slots of the input table and generate an output table including the statistic value. In this case, for example, information of the constraint model, indicating that the label "average) XX" of the output table is associated with the label "XX" (XX indicates any text string) of the input table, is associated with the script and stored in the script storage unit 130. In addition, the script may generate one output table from one input table.

In this manner, the constraint condition indicated by the constraint model includes at least one of that the column name of a column and the column name of another column are the same and that the difference between the column name of the one column and the column name of the another column is a predetermined word.

Figure 8:
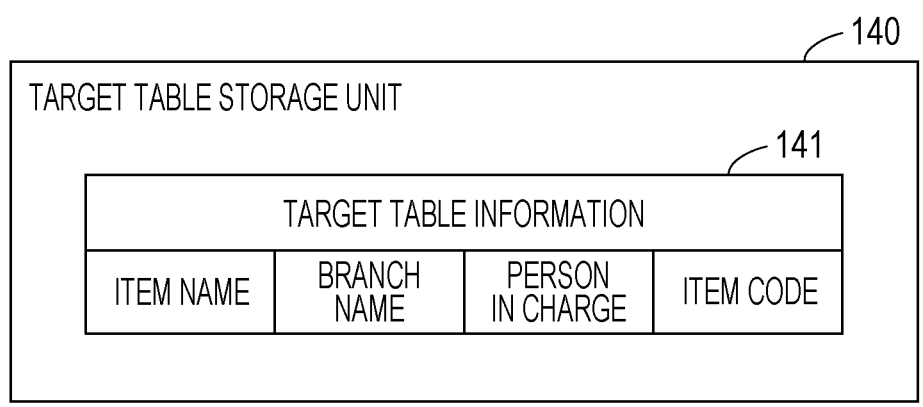
FIG. 8 is a diagram illustrating an example of target table information.

FIG. 8 is a diagram illustrating an example of the target table information. The target table information 141 is input by the user and stored in the target table storage unit 140. The target table information 141 indicates that "item name", "branch name", "person in charge" and "item code" are specified as labels of the target table in this arrangement order.

Figure 9:
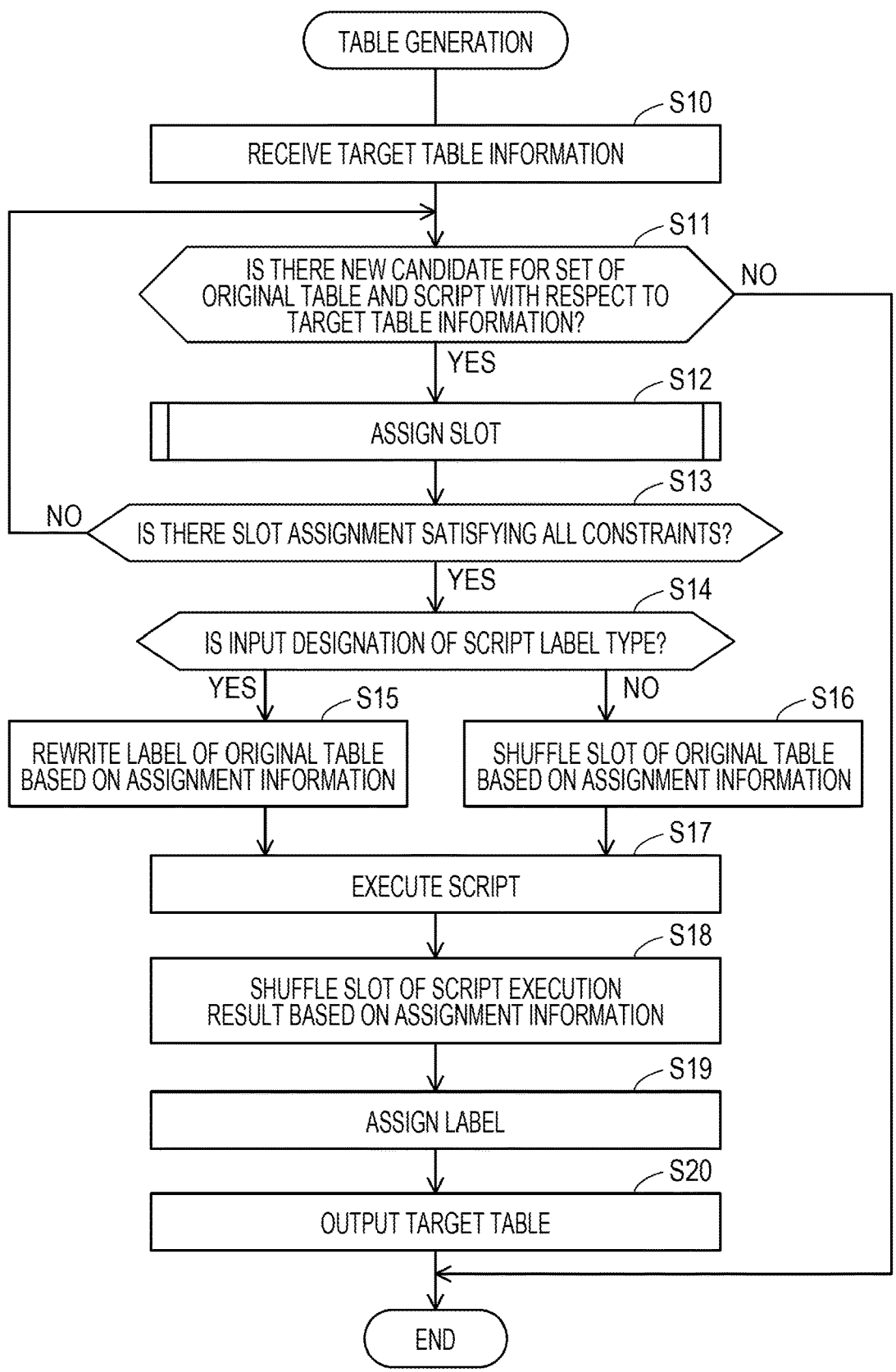
FIG. 9 is a flowchart illustrating an example of table generation processing.

Next, the procedure of generating a table by the table generation device 100 will be described. FIG. 9 is a flowchart illustrating an example of table generation processing.

(S10) The UI unit 150 receives the target table information 141. The table generation unit 161 acquires the target table information 141 from the UI unit 150 and stores the target table information 141 in the target table storage unit 140.

(S11) The table generation unit 161 determines whether or not there is a new candidate for a set of the original table and the script with respect to the target table information 141. When there is a new candidate, the process proceeds to step S12. When there is no new candidate, the process of table generation is completed (in this case, the target table is not automatically generated). Here, the table generation unit 161 specifies candidates of the original table based on the target table information 141. For example, it is conceivable that the table generation unit 161 specifies a combination of original tables that includes all the labels included in the target table information 141 as the candidate. In addition, it is conceivable that the table generation unit 161 sequentially selects scripts as the candidates one by one.

(S12) The slot assignment unit 162 executes slot assignment processing. Details of the slot assignment processing will be described below. (S13) In accordance with the result of the slot assignment processing by the slot assignment unit 162, the table generation unit 161 determines whether there is a slot assignment satisfying all the constraints indicated by the constraint model for the script. When there is a slot assignment satisfying all the constraints, the process proceeds to step S14. When there is no slot assignment satisfying all the constraints, the process proceeds to step S11. For example, when the assignment information may be acquired from the slot assignment unit 162, the table generation unit 161 determines that there is a slot assignment satisfying all the constraints. When the assignment information may not be acquired from the slot assignment unit 162, the table generation unit 161 determines that there is no slot assignment satisfying all the constraints.

(S14) The table generation unit 161 determines whether or not the input specifying of the script is the label type. When it is the label type, the process proceeds to step S15. When it is the slot position type, the process proceeds to step S16. As described above, the table generation unit 161 determines whether the description method of the script according to the constraint model is the label type or the slot position type, depending on whether or not label information is held in the constraint model.

(S15) The table generation unit 161 rewrites the label of the original table based on the assignment information. Then, the process proceeds to step S17.

(S16) The table generation unit 161 shuffles the slots of the original table based on the assignment information. Then, the process proceeds to step S17.

(S17) The table generation unit 161 executes the script on the original table after rewriting the label in step S15 or the original table after shuffling the slots in step S16, and obtains the script execution result.

(S18) The table generation unit 161 shuffles the slots of the script execution result based on the assignment information.

(S19) The table generation unit 161 generates the target table by assigning a label indicated by the target table information 141 to the result of step S18, and stores the target table in the target table storage unit 140.

(S20) The UI unit 150 acquires the generated target table from the table generation unit 161 and outputs the same. For example, the UI unit 150 causes the display 111 to display the target table.

Figure 10:
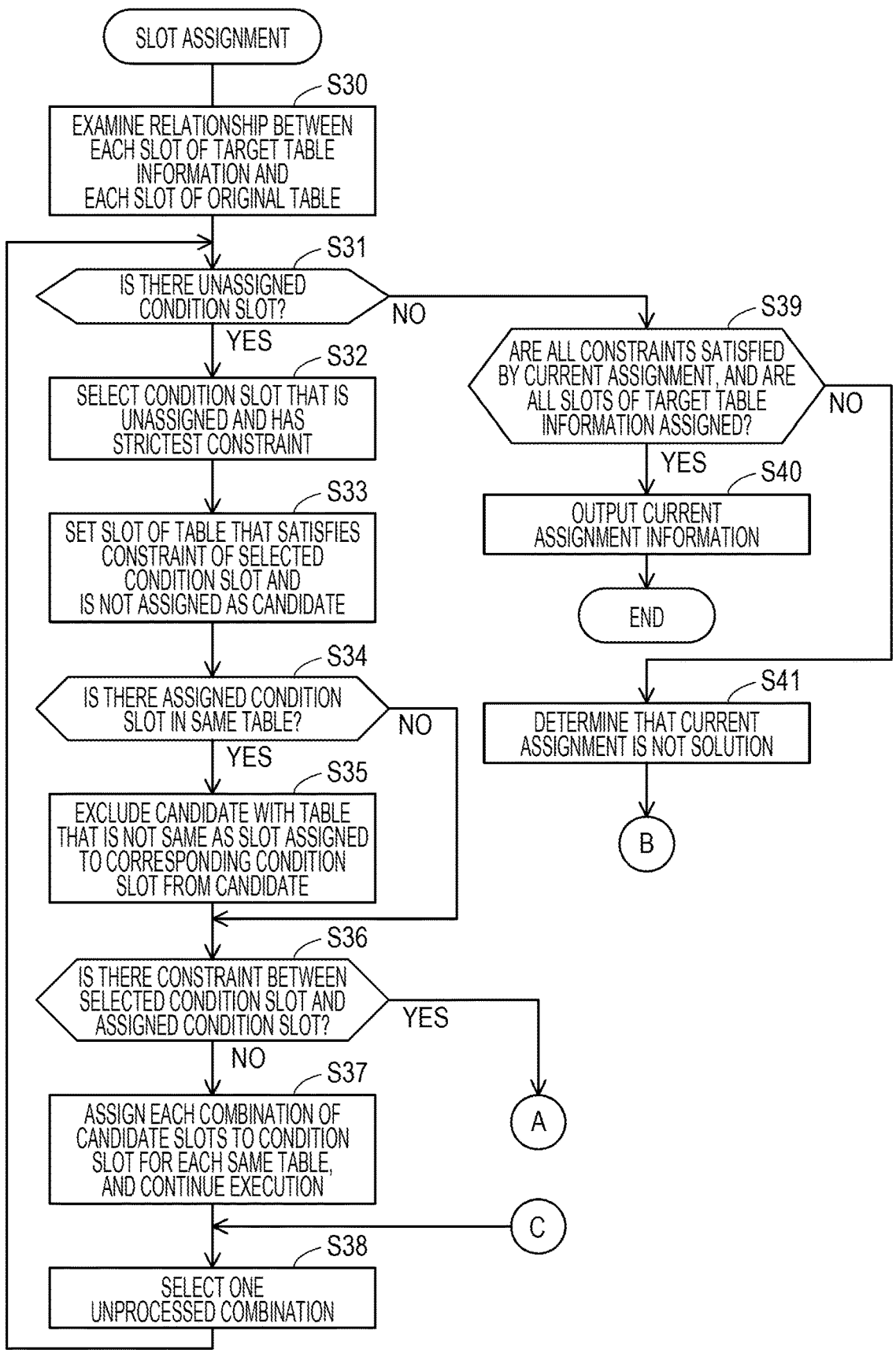
FIG. 10 is a flowchart illustrating an example of slot assignment processing.

FIG. 10 is a flowchart illustrating an example of slot assignment processing with reference to FIGS. 4, 8, and 9. The slot assignment process is executed in step S12.

(S30) The slot assignment unit 162 examines the relationship between each slot of the target table information 141 and each slot of the original table. For example, the slot assignment unit 162 confirms the slots of the target table information 141 and the slots of the original table, which match in labels. Here, in order to distinguish from the target table information 141 and the slot of the original table, the slot in the constraint model is referred to as "condition slot".

The slot assignment unit 162 generates assignment information with an empty label for the condition slot of the constraint model corresponding to the script being selected and stores the assignment information in the script storage unit 130.

(S31) With reference to the assignment information, the slot assignment unit 162 determines whether there is an unassigned condition slot for a slot (or a label corresponding to the slot) of the original table or the target table information 141. When there is the unassigned condition slot, the process proceeds to step S32. When there is no unassigned condition slot, the process proceeds to step S39.

(S32) The slot assignment unit 162 selects a condition slot that is unassigned and that has the strictest constraint. Here, the strict constraint means that many edges are connected to the node corresponding to the corresponding condition slot in the constraint model. For example, the condition slot having the strictest constraint is the condition slot corresponding to the node to which the largest number of edges are connected. When there are a plurality of nodes to which the largest number of edges are connected, the slot assignment unit 162 sets the condition slot having the smallest number of assignment candidate slots as the condition slot having the strictest constraint.

(S33) The slot assignment unit 162 sets a slot of a table (original table or target table information 141) that satisfies the constraint of the selected condition slot and that is not assigned, as an assignment candidate for the condition slot.

(S34) The slot assignment unit 162 determines whether or not there is an assigned condition slot in the table same as the selected condition slot in the constraint model. When there is the assigned condition slot in the same table, the process proceeds to step S35. When there is no assigned condition slot in the same table, the process proceeds to step S36.

(S35) The slot assignment unit 162 excludes an assignment candidate, of which table is not the same as the slot assigned to the condition slot, from the assignment candidates based on the column structure of the original table. For example, the slot assignment unit 162 selects the table that includes the slot assigned to the condition slot, as a source of the assignment candidates.

(S36) The slot assignment unit 162 determines whether or not there is a constraint between the condition slot selected in step S32 and the assigned condition slot. When there is the constraint, the process proceeds to step S42. When there is no constraint, the process proceeds to step S37.

(S37) The slot assignment unit 162 assigns each combination of candidate slots to the condition slot for each same table, and continues execution. (S38) The slot assignment unit 162 selects one unprocessed combination. Then, the process proceeds to step S31.

(S39) The slot assignment unit 162 determines whether or not all the constraints in the constraint model are satisfied by the current assignment, and whether or not all the slots of the target table information 141 are assigned. When all the constraints are satisfied by the current assignment and all the slots of the target table information 141 are assigned, the process proceeds to step S40. Otherwise, the process proceeds to step S41.

(S40) The slot assignment unit 162 outputs the current assignment information. For example, the slot assignment unit 162 stores the assignment information in the script storage unit 130. The slot assignment unit 162 provides the assignment information to the table generation unit 161. Then, the slot assignment process is completed.

(S41) The slot assignment unit 162 determines that the current assignment is not a solution. Then, the process proceeds to step S47.

Figure 11:
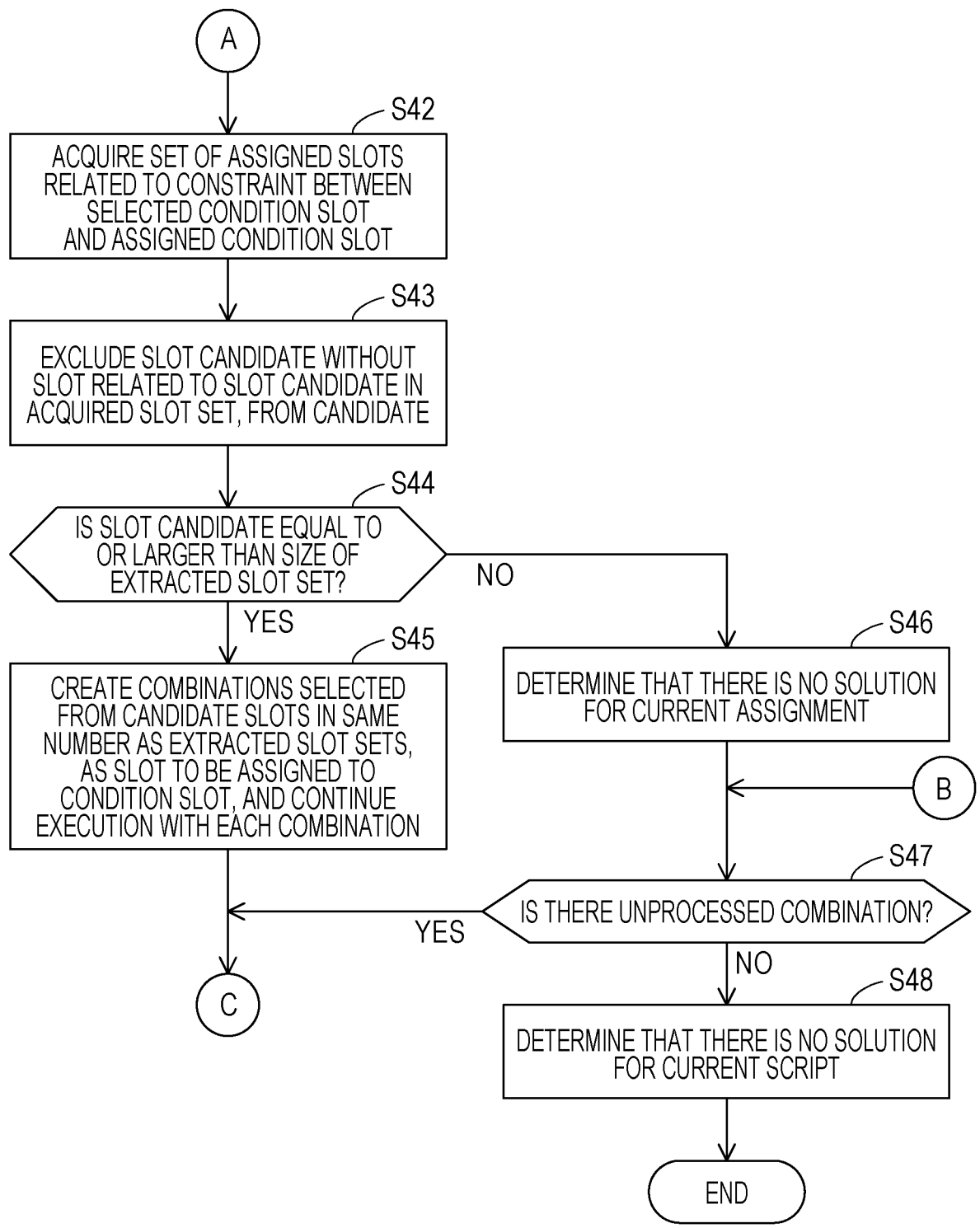
FIG. 11 is a flowchart illustrating an example of slot assignment processing (continuation)

FIG. 11 is a flowchart illustrating an example of slot assignment processing (continuation).

(S42) The slot assignment unit 162 acquires a set (slot set) of assigned slots related to the constraint between the condition slot selected in step S32 and the assigned condition slot.

(S43) The slot assignment unit 162 excludes a slot candidate, of which a slot related to the slot candidates (the slots that are candidates for assignment to the condition slot) is not included in the acquired slot set, from the assignment candidates.

(S44) The slot assignment unit 162 determines whether or not the slot candidate is equal to or larger than the size of the extracted slot set. When the slot candidate is equal to or larger than the size of the extracted slot set, the process proceeds to step S45. When the slot candidate is smaller than the size of the extracted slot set, the process proceeds to step S46.

(S45) The slot assignment unit 162 creates the same number of combinations as the extracted slot sets that are selected from the candidate slots, as the slots to be assigned to the condition slot, and continues execution with each combination. Then, the process proceeds to step S38.

(S46) The slot assignment unit 162 determines that there is no solution for the current assignment.

(S47) The slot assignment unit 162 determines whether or not there is an unprocessed combination. When there is an unprocessed combination, the process proceeds to step S38. When there is no unprocessed combination, the process proceeds to step S48.

(S48) The slot assignment unit 162 determines that there is no solution for the current script. In this case, the slot assignment unit 162 does not provide the assignment information to the table generation unit 161. Then, the slot assignment process is completed.

In this way, the slot assignment unit 162 generates the assignment information by executing the slot assignment process. For example, the constraint model includes an input slot indicating a position of a column included in the input table, an output slot indicating a position of a column included in the output table, and the constraint condition specified for the input slot and the output slot. Then, the slot assignment unit 162 estimates a constraint relationship between a column of the original table and a column of the target table based on a column name of the column included in the original table and a column name of the column included in the target table. Then, the slot assignment unit 162 assigns the column included in the original table to the input slot and performs assignment processing for the column included in the target table to the output slot based on the constraint condition indicated by the constraint model and the estimated constraint relationship. By the assignment processing, it is possible to appropriately determine whether or not the script may be used for generation of the target table.

In the assignment processing, the slot assignment unit 162 determines an assignment of the column of the original table or the column of the target table by preferring a slot having a larger number of constraints existing between slots other than the input and output slots among a plurality of slots including the input slot and the output slot. As a result, the number of combinations of slot assignments may be efficiently reduced, and the slot assignment speed may be increased.

In addition, in the assignment processing, the slot assignment unit 162 selects one slot among a plurality of slots including the input slot and the output slot, and narrows down the column of the original table or the column of the target table to be assigned to the selected slot based on the estimated constraint relationship. As a result, the number of combinations of slot assignment may be efficiently reduced, and the slot assignment speed may be increased.

Further, there may be a plurality of original tables, and there may be a plurality of input slots. In this case, in the assignment processing, the slot assignment unit 162 assigns a first column of the plurality of original tables to a first input slot of the plurality of input slots, and then narrows down a second column of the plurality of original tables to be assigned to the second input slot of the plurality of input slots based on an identity between the original table including the first column and an original table including the second column. As a result, the number of combinations of slot assignment may be efficiently reduced, and the slot assignment speed may be increased.

Next, a specific example of table generation by the above procedure will be described. In the following description, the case where the target table information 141 is input to the table generation device 100 will be exemplified. The table generation unit 161 selects the tables 121 and 122 as the original tables. In addition, the table generation unit 161 selects the tables 121 and 122 and the script 131 with respect to the target table information 141 as the processing target of the slot assignment.

FIG. 12 is a diagram illustrating a specific example of table generation. The slot assignment unit 162 confirms a match between each label of the tables 121 and 122 and each label indicated by the target table information 141 (step ST1). In the drawing, the slots where the match is confirmed are connected with an edge.

The slot assignment unit 162 generates assignment information 134 based on the constraint model 133 of the script 131 and stores the assignment information 134 in the script storage unit 130. At this stage, there is no slot assignment to each condition slot in the assignment information 134. The slot assignment unit 162 selects the condition slot 5 that is unassigned and that has the strictest constraint (step ST2). Here, the condition slots 1, 3, and 5 have two constraints, respectively, which is the largest number of constraints. In addition, there are two assignment candidates for the condition slots 1 and 3 (there are two labels "item code" in total in tables 121 and 122), and there is one assignment candidate for the condition slot 5. Therefore, the slot assignment unit 162 sets the condition slot 5 as the assignment target.

The slot assignment unit 162 sets the slot of the table that satisfies the constraints of the selected condition slot 5 and that is not assigned as a candidate (step ST3). The condition slot 5 is included in an output table by script. Therefore, the slot assignment unit 162 sets the slot of the label "item code", which satisfies the two constraints of the condition slot 5 and which is not assigned, in the target table information 141 as an assignment candidate for the condition slot 5.

FIG. 13 is a diagram illustrating a specific example of table generation (continuation). The slot assignment unit 162 creates all the assignment candidates for the slot 5 (step ST4). Here, the assignment candidates include "empty" (when no slot to be assigned is selected). Therefore, at this stage, the slot assignment unit 162 creates the label "item code" and "empty" as the assignment candidates for the slot 5.

The slot assignment unit 162 first assigns the slot of the label "item code" to the slot 5 (step ST5). The slot assignment unit 162 records in the assignment information 134 that the label "item code" is assigned to the slot 5.

Next, the slot assignment unit 162 selects the condition slot 1 as the assignment target condition slot (step ST6). When there are a plurality of condition slots having the strictest constraint, the slot assignment unit 162 may select the condition slot to be assigned in any order from among them.

FIG. 14 is a diagram illustrating a specific example of table generation (continuation). The slot assignment unit 162 sets the slot of the table, which satisfies the constraints of the selected condition slot 1 and which is not assigned, as a candidate (step ST7). The condition slot 1 is a slot included in the original table. The original table corresponding to the condition slot 1 is one of the tables 121 and 122. Therefore, the slot assignment unit 162 sets the two slots of the label "item code" in the table 121 and 122, which satisfy the two constraints of the condition slot 1 and which are not assigned, as the assignment candidates for the condition slot 1.

Here, in order to distinguish the labels "item code" of each of the tables 121 and 122, for convenience, the label of the table 121 is expressed as "item code (1)" and the label of the table 122 is expressed as "item code (2)". The expression is a matter of convenience, and all of the labels for "item code", "item code (1)" and "item code (2)" have the same contents. At this stage, there is no condition slot assigned in the table (table including the condition slots 1 and 2) same as the condition slot 1.

The slot assignment unit 162 creates all the assignment candidates for the condition slot 1 (step ST8). Here, based on the constraint model 133, the slot assignment unit 162 detects if there is a constraint that the labels match between the assigned condition slot 5 and the condition slot 1. Therefore, from the assignment information 134, the slot assignment unit 162 acquires the label "item code" assigned to the condition slot 5. In step ST7, all the assignment candidates for the acquired condition slot 1 match the label "item code" assigned to the condition slot 5. Therefore, the slot assignment unit 162 creates labels "item code (1)" and "item code (2)" as assignment candidates for the condition slot 1.

The slot assignment unit 162 assigns the slot of the label "item code (1)" to the condition slot 1 (step ST9). The slot assignment unit 162 records, in the assignment information 134 that the slot of the label "item code (1)" is assigned to the condition slot 1.

FIG. 15 is a diagram illustrating a specific example of table generation (continuation). Next, the slot assignment unit 162 selects the condition slot 3 as the assignment target condition slot (step ST10).

The slot assignment unit 162 specifies the slot of the label "item code (2)" of the table 122 as the assignment candidate for the condition slot 3. The condition slot 3 has a constraint that its label matches the labels of the condition slots 1 and 5. The label "item code (2)" matches "item code" and "item code (1)". Therefore, the slot assignment unit 162 assigns the label "item code (2)" to the condition slot 3 (step ST11). The slot assignment unit 162 records in the assignment information 134 that the slot of the label "item code (2)" is assigned to the condition slot 3.

Since the assignment to the condition slot having two match relationships is completed, subsequently, the slot assignment unit 162 then selects the condition slot having one match relationship as the assignment target. For example, the slot assignment unit 162 selects the condition slot 2 as the next assignment target (step ST12).

FIG. 16 is a diagram illustrating a specific example of table generation (continuation). The condition slot 1 included in the same table as the condition slot 2 is assigned. According to the assignment information 134, the slot of the label "item code (1)" is assigned to the condition slot 1. Therefore, the slot assignment unit 162 excludes the slots (slots of labels "branch name", "person in charge" of the table 122) included in the table different from the table 121 including the label "item code (1)" from the assignment candidates. The condition slot 2 has no constraint with the assigned condition slot based on the constraint model 133. In this case, the assignment candidate for the condition slot 2 is the slot of the label "item name" of the table 121 (step ST13).

The slot assignment unit 162 creates all the assignment candidates for the condition slot 2 (step ST14). For example, the slot assignment unit 162 creates "empty" and a label "item name" as assignment candidate for the condition slot 2.

The slot assignment unit 162 assigns "empty" to the condition slot 2 (step ST15). The slot assignment unit 162 records in the assignment information 134 that "empty" is assigned to the condition slot 2.

FIG. 17 is a diagram illustrating a specific example of table generation (continuation). Since the condition slot 2 is assigned and the constraint of the condition slot 6 is stricter than the other condition slots, the slot assignment unit 162 sets the condition slot 6 as the next assignment target. According to the constraint model 133, the label of the condition slot 6 matches the label of the condition slot 2. Therefore, since "empty" is assigned to the condition slot 2, the slot assignment unit 162 assigns "empty" to the condition slot 6 (step ST16).

The slot assignment unit 162 sets the condition slot 7 as the next assignment target (step ST17). The condition slot 7 is included in an output table by script. Therefore, the slot assignment unit 162 sets three unassigned slots corresponding to the labels "item name", "branch name", and "person in charge" in the target table information 141 as the assignment candidates for the condition slot 7 (step ST18). At this stage, the condition slot 7 has no constraint with the other condition slots being assigned.

FIG. 18 is a diagram illustrating a specific example of table generation (continuation). The slot assignment unit 162 creates all the assignment candidates (whole combinations of candidate slots) of the condition slot 7 by using the assignment candidates selected for the condition slot 7 (step ST19). In this case, all the assignment candidates include the following 8 combinations (including "empty").

First, there is a set of slots including the slot of the label "item name", the slot of the label "branch name" and the slot of the label "person in charge". Second, there is a set of slots including the slot of the label "item name" and the slot of the label "branch name". Third, there is a set of slots including the slot of the label "item name" and the slot of the label "person in charge". Fourth, it is a set of slots including the slot of label "branch name" and the slot of label "person in charge". Fifth, there is the slot of label "item name". Sixth, there is the slot of label "branch name". Seventh, there is the slot of label "person in charge". Eighth, there is "empty".

Here, a label of a set of slots combining the first slot (labeled as "label 1") and the second slot (labeled as "label 2") is provided as one label such as "label 1 label 2", which has the original two labels separated by a space therebetween. However, there may be a delimiter other than the space.

The slot assignment unit 162 assigns a set of slots combining a slot of the label "item name", a slot of the label "branch name" and a slot of the label "person in charge" among the eight assignment candidates created in step ST19 to the condition slot 7 (step ST20). The slot assignment unit 162 records in the assignment information 134 in the target table information 141 that the set of slots combining the slot of the label "item name", the slot of the label "branch name" and the slot of the label "person in charge" is assigned to the condition slot 7.

The slot assignment unit 162 selects the condition slot 4, which has one matching constraint and to which the slot is not assigned, as the next assignment target (step ST21).

FIG. 19 is a diagram illustrating a specific example of table generation (continuation). The slot assignment unit 162 specifies the slot of the label "item name" of the table 121, the slot of the label "branch name" of the table 122, and the slot of the label "person in charge" of the table 122, which have one matching constraint, as the assignment candidates for the condition slot 4 (step ST22).

The condition slot 3 included in the same table as the condition slot 4 is assigned. According to the assignment information 134, the slot of the label "item code (2)" is assigned to the condition slot 3. Therefore, the slot assignment unit 162 excludes slots included in a table different from the table 122 that includes the label "item code (2)" (specifically, the slot of the label "item name" included in the table 121) from the assignment candidates (step ST23).

The slot assignment unit 162 detects that the set of slots of the labels "item name", "branch name", and "person in charge" is assigned to the condition slot 7 which has the constraint that the label matches with the condition slot 4, based on the assignment information 134. In this case, the size of the set of slots assigned to the condition slot 7 is 3. In addition, the assignment candidates at this stage are the slot of label "branch name" and the slot of label "person in charge". For example, the number of candidates is 2, which is less than the size 3 of the set of slots assigned to the condition slot 7. Therefore, the slot assignment unit 162 determines that there is no solution in the current assignment (step ST24).

FIG. 20 is a diagram illustrating a specific example of table generation (continuation). The slot assignment unit 162 returns to the assignment of the condition slot 7. The slot assignment unit 162 assigns the set of slots of the label "item name" and the label "branch name" to the condition slot 7 (step ST25). The slot assignment unit 162 records in the assignment information 134 that the set of slots of the label "item name" and the label "branch name" is assigned to the condition slot 7.

Then, the slot assignment unit 162 specifies the slot of the label "item name" of the table 121, the slot of the label "branch name" of the table 122, and the slot of the label "person in charge" of the table 122, which have one matching constraint, as the assignment candidates for the condition slot 4. The condition slot 3 included in the same table as the condition slot 4 is assigned. According to the assignment information 134, the slot of the label "item code (2)" is assigned to the condition slot 3. Therefore, the slot assignment unit 162 excludes the slot (slot of the label "item name" included in the table 121) included in a table different from the table 122 that includes the label "item code (2)" from the assignment candidate. In addition, the slot assignment unit 162 excludes the slot (slot of label "person in charge" in the table 122), which is not included in the slot assigned to the condition slot 7 having the constraint that the labels match the condition slot 4, from the assignment candidates (step ST26).

The slot assignment unit 162 detects that the set of slots of the label "item name", and "branch name" is assigned for the condition slot 7 having the constraint that the label matches the condition slot 4, based on the assignment information 134. In this case, the size of the set of slots assigned to the condition slot 7 is 2. In addition, the assignment candidate at this stage is the slot of label "branch name". For example, the number of candidates is 1, which is less than the size 2 of the set of slots assigned to the condition slot 7. Therefore, the slot assignment unit 162 determines that there is no solution in the current assignment (step ST27).

FIG. 21 is a diagram illustrating a specific example of table generation (continuation). In the same way, the slot assignment unit 162 attempts the assignment to the condition slot 7. The slot assignment unit 162 assigns the set of slots of the label "branch name" and the label "person in charge" to the condition slot 7. The slot assignment unit 162 records in the assignment information 134 that the set of slots of the label "branch name" and the label "person in charge" is assigned to the condition slot 7.

In this case, the set of slots of the label "branch name" and the label "person in charge" assigned to the condition slot 7 matches the set of slots of the label "branch name" and the label "person in charge" in the table 122. Therefore, the slot assignment unit 162 assigns the set of slots of the label "branch name" and the label "person in charge" to the condition slot 4 (step ST28). The slot assignment unit 162 records in the assignment information 134 that the set of slots of the label "branch name" and the label "person in charge" is assigned to the condition slot 4.

At this stage, all the condition slots of the assignment information 134 are assigned. However, in the assignment information 134 at this stage, the slots assigned to the condition slots of the output table are the slots of the labels "item code", "branch name" and "person in charge" slots, and the slot of the label "item name" included in the target table information 141 is not included. Therefore, the slot assignment unit 162 determines that the assignment information 134 at this stage is not a solution.

Although the slot assignment unit 162 subsequently attempts the assignment to the condition slot 7 in the same manner, there is no solution (step ST29). Therefore, the slot assignment unit 162 retraces the assignment results for the condition slot and restarts the assignment processing. The slot assignment unit 162 clears the assignment results of the label for the condition slot 7 in the assignment information 134.

The slot assignment unit 162 returns to the assignment of the condition slot 6, but there are no other assignment candidates. The slot assignment unit 162 clears the assignment results of the label for the condition slot 6 in the assignment information 134. Then, the slot assignment unit 162 returns to the assignment of the condition slot 2 and attempts assignment of the slot of the label "item name" which is another assignment candidate (step ST30).

FIG. 22 is a diagram illustrating a specific example of table generation (continuation). The slot assignment unit 162 performs the assignment for the condition slots 6, 7, and 4 in the subsequent stages in the same manner, and the assignment for all condition slots is completed (step ST31). For example, the slot of the label "item name" is assigned to the condition slot 6. The set of the slots of the label "branch name" and the label "person in charge" is assigned to the condition slot 7. The set of the slots of the label "branch name" and the label "person in charge" is assigned to the condition slot 4. The slot assignment unit 162 records the assignment result in the assignment information 134.

According to the assignment information 134, the assignment result at this stage satisfies all the constraints indicated by the constraint model 133, and the condition slots on the output table side include all the slots included in the target table information 141. Therefore, the slot assignment unit 162 completes the slot assignment processing, and provides the assignment information 134 to the table generation unit 161.

The table generation unit 161 converts the column structure of the tables 121 and 122 based on the assignment information 134 (step ST32). According to the assignment information 134, the table having the slot of the label "item code (1)" and the slot of the label "item name" is the input table. Therefore, the table generation unit 161 selects the slot of the label "item name" and the slot of the label "item code" from the table 121, and generates the table 121*a* in which the order of the slots is shuffled to an order of "item code" and "item name". However, the order of the slots may not be changed when the description of the script is the label type (because it is possible to specify columns by labels).

In addition, the table generation unit 161 performs label conversion of the table 121*a*. According to the script 131, the label corresponding to "item code (1)" in the condition slot 1 is "branch name". Therefore, the table generation unit 161 changes the label "item code" of the table 121*a* to "branch name". According to the script 131, the label corresponding to the "item name" in the condition slot 2 is "sales". Therefore, the table generation unit 161 changes the label "item name" of the table 121*a* to "sales". The table 121*b* is the result of these label conversions for the table 121*a* by the table generation unit 161.

Further, according to the assignment information 134, a table having the slots of the label "item code (2)" and the label "branch name person in charge" is an input table. Therefore, the table generation unit 161 selects the slot of the label "item code", the slot of the label "branch name", and the slot of the label "person in charge" from the table 122. Then, the table generation unit 161 generates a table 122*a* in which the slot of label "branch name" and the slot of label "person in charge" among these slots are combined in this order into one slot.

Here, the table generation unit 161 sets the labels of the integrated slots as one label (for example, "branch name person in charge") in which original labels of the slots are separated by spaces. The table generation unit 161 sets the values set in the slots collected into one, as a value obtained by separating the two values set in the original two slots with a space while maintaining the order (for example, one value such as "value of "branch name" value of "person in charge"").

In addition, the table generation unit 161 performs label conversion of the table 122*a*. According to the script 131, the label corresponding to "item code (2)" in the condition slot 3 is "branch name". Therefore, the table generation unit 161 changes the label "item code" of the table 122*a* to "branch name. According to the script 131, the label corresponding to "item name" in the condition slot 4 is "telephone number". Therefore, the table generation unit 161 changes the label "branch name" person in charge" in the table 122*a* to "telephone number". The table 122*b* is the result of these label conversions on the table 122*a* by the table generation unit 161.

Figure 23:
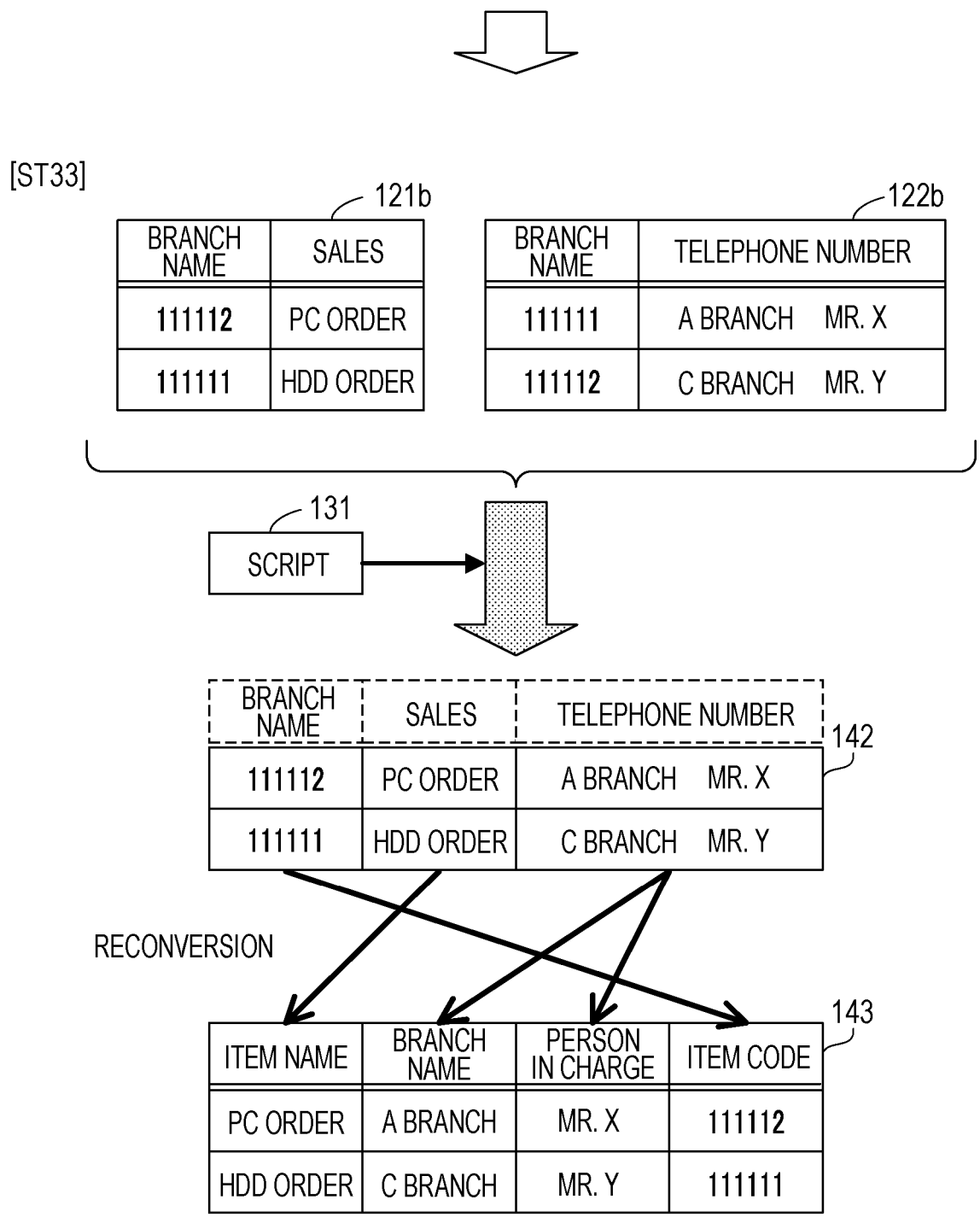
FIG. 23 is a diagram illustrating a specific example of table generation (continuation).

FIG. 23 is a diagram illustrating a specific example of table generation (continuation). The table generation unit 161 executes the script 131 with respect to the tables 121*b* and 122*b* and reconverts the column structure of the execution result based on the assignment information 134, thereby generating the target table 143 (step ST33).

For example, the table generation unit 161 executes the script 131 with respect to table 121*b* and 122*b*, and generates the table 142 as a result of the execution. The table generation unit 161 stores the table 142 in the target table storage unit 140. The table 142 may not include label. According to the script 131, the table 142 includes slots corresponding to the labels "branch name", "sales" and "telephone number", starting from the front of the column (from the left end in the drawing).

The table generation unit 161 reconverts the column structure of the table 142 based on the assignment information 134. According to the assignment information 134, the slot in the first column of the table 142 corresponding to the condition slot 5 of the assignment information 134 corresponds to the slot of the label "item code". In addition, the slot in the second column of the table 142 corresponding to the condition slot 6 of the assignment information 134 corresponds to the slot of the label "item name". Further, the slot in the third column of the table 142 corresponding to the condition slot 7 of the assignment information 134 corresponds to the slot of the label "branch name person in charge" slot.

Therefore, the table generation unit 161 converts the column structure of the table 142 as described below to have the column structure as specified by the target table information 141. First, the table generation unit 161 sets the second slot of the table 142 as the first slot of the target table. Secondly, the table generation unit 161 separates the third slot of the table 142 into two slots with a space as the delimiter. Then, the table generation unit 161 sets the slot corresponding to the front of the delimiter as the second slot of the target table and sets the slot corresponding to the back of the delimiter as the third slot of the target table. Third, the table generation unit 161 sets the first slot of the table 142 as the fourth slot of the target table. In this way, the table generation unit 161 reconverts the column structure of the table 142, thereby generating the target table 143. The table generation unit 161 stores the generated target table 143 in the target table storage unit 140.

Then, the UI unit 150 causes the display 111 to display the target table 143 generated by the table generation unit 161. The user may confirm the target table 143 generated for the target table information 141 based on the content displayed on the display 111.

This makes it easy to reuse existing scripts. For example, as illustrated in the scripts 131 and 132, the existing scripts are written in accordance with the column structure of a specific table. Therefore, the existing scripts may not be reused in other tables when there is a discrepancy between the tables other than the specific table and the column structure as specified by the existing script (for example, when column order, column name and number of columns is different). Therefore, when a new table is generated using another input table, the possibility of reusing existing scripts is low.

Therefore, the table generation device 100 converts the column structure of the original table according to the constraint model related to the input and output table attached to the existing script, inputs the same, and reconverts the obtained column structure of the output table to the target structure, thus facilitating the reuse existing scripts.

Therefore, by inputting the target table information 141 to the table generation device 100, the user may have the table generation device 100 generate the target table 143 without having to write a new script. In addition, the number of cases that the previously-executed scripts may be used increases.

Furthermore, in the slot assignment processing by the slot assignment unit 162, depending on the assignment order, the number of candidates for slot assignment is large, and the possibility of combinatorial explosion increases. As an example, it is conceivable to perform assignment processing from condition slot 2 in the tables 121 and 122, the script 131, the constraint model 133 and the target table information 141. In this case, since there is one same label on the output table side in the condition slot 2, the five slots in the tables 121 and 122 (slots of the labels "item name, "item code" (1)", "item code" (2) "branch name", "person in charge") are candidates. The combinations that determine whether the 5 slots are assigned or not assigned is 32, which is the result of squaring 2 to 5. Next, it is conceivable to perform assignment processing to condition slot 7. In the condition slot 7, since there is one same label on the input table side, four slots indicated by the target table information 141 (slots of the labels "item name", "branch name", "person in charge", and "item code") are candidates. The combinations are 16, which is the result of squaring 2 to 4. When this assignments are combined with the previous assignments, the number of combinations is 512, which is the result of 32×16. Likewise, when the assignment is continued, the combination will be enormous.

Therefore, the slot assignment unit 162 preferentially assigns from the condition slots with stricter constraints and fewer candidates. The strict constraint means the following case. First, in the constraint model, the number of conditions is large (many edges are connected to the node corresponding to the condition slot). Secondly, there are few assignment candidate slots. Thirdly, it also includes that the condition of a single label is specified (for example, the label of the target table information includes text string of "average" and the like).

In this manner, the slot assignment unit 162 may efficiently reduce the slots of the assignment candidate by preferentially assigning the condition slot having the stricter constraint as the assignment target. As a result, the number of combinations of slot assignment by the slot assignment unit 162 may be reduced and slot assignment may be performed at high speed. As a result, it is possible to speed up the generation of the target table by the table generation device 100.

In addition, as exemplified in steps ST12 and ST13 of FIGS. 15 and 16 and steps ST22 and ST23 of FIG. 19, the slot assignment unit 162 excludes, from the assignment candidates, assignment candidate slot of a table that is different from the assignment original table of other assigned condition slots included in the same table as the assignment target condition slot. In addition, due to such limitation, condition slots that may narrow down assignment candidates are preferentially set as the assignment target. In this way, the slot assignment unit 162 may efficiently reduce the assignment candidate slots. As a result, the number of combinations of slot assignment by the slot assignment unit 162 may be reduced and slot assignment may be performed at high speed. As a result, it is possible to speed up the generation of the target table by the table generation device 100.

The information processing according to the first embodiment may be realized by causing the processing unit 12 to execute a program. In addition, the information processing according to the second embodiment may be realized by causing the CPU 101 to execute a program. The program may be recorded on the computer readable recording medium 113.

For example, it is possible to distribute the program by distributing the recording medium 113 in which the program is recorded. Alternatively, the program may be stored in other computers and the program may be distributed through the network. For example, the computer may store (install) a program recorded on the recording medium 113 or a program received from another computer in a storage device such as the RAM 102 or the HDD 103, and may read and execute the program from the storage device Good.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method performed by a processor included in a table generation device, the method comprising:

acquiring a first input table used for generating a target table, based on target table information indicating a column included in the target table to be generated;

acquiring a script for generating a first output table from the first input table, and a constraint model indicating a constraint condition between a column included in the first input table and a column included in the first output table;

converting the first input table into a second input table such that the second input table obtained by converting a column structure of the first input table and a second output table to be obtained by converting a column structure of the target table comply with the constraint condition, and generating assignment information indicating a correspondence relationship between a column to be included in the second output table and a column included in the target table;

generating the second output table from the script and the second input table, and converting the second output table into the target table, based on the assignment information;

estimating a constraint relationship between a column of the first input table and a column of the target table, based on a column name of a column included in the first input table and a column name of a column included in the target table; and assigning the column included in the first input table to the input slot and assigning the column included in the target table to the output slot, based on the constraint condition indicated by the constraint model and the estimated constraint relationship, the constraint model includes an input slot indicating a position of the column included in the first input table, an output slot indicating a position of the column included in the first output table, and the constraint condition specified for the input slot and the output slot, and the assigning includes determining an assignment of a column of the original table or a column of the target table by preferring a slot having a larger number of constraints existing between slots other than the input and output slots among a plurality of slots including the input slot and the output slot.

2. The method of claim 1, wherein the assigning includes:
selecting one slot among a plurality of slots including the input slot and the output slot, and
narrowing down a column of the first input table or a column of the target table to be assigned to the selected slot, based on the estimated constraint relationship.

3. The method of claim 1, wherein:
a plurality of the first input tables are provided, and a plurality of the input slots are provided; and
the assigning includes assigning a first column of the plurality of first input tables to a first input slot of the plurality of input slots and then narrowing down a second column of the plurality of first input tables to be assigned to a second input slot of the plurality of input slots, based on an identity between a first input table including the first column and a first input table including the second column.

4. The method of claim 1, wherein the converting from the first input table into the second input table includes at least one of changing a column name of a column included in the first input table, and changing a column order of a column included in the first input table.

5. The method of claim 1, wherein:
the converting from the first input table into the second input table includes integrating two or more columns included in the first input table into one column; and
the converting from the second output table into the target table includes dividing one column included in the second output table into two or more columns.

6. The method of claim 1, wherein the constraint condition includes at least one of a condition that a column name of a first column is identical with a column name of a second column, and a condition that a difference between the column name of the first column and the column name of the second column is a predetermined word.

7. A table generation device comprising:
a memory; and
a processor coupled to the memory and configured to:
acquire a first input table used for generating a target table, based on target table information indicating a column included in the target table to be generated;
acquire a script for generating a first output table from the first input table, and a constraint model indicating a constraint condition between a column included in the first input table and a column included in the first output table;
convert the first input table into a second input table such that the second input table obtained by converting a column structure of the first input table and a second output table to be obtained by converting a column structure of the target table comply with the constraint condition, and generate assignment information indicating a correspondence relationship between a column to be included in the second output table and a column included in the target table;
generate the second output table from the script and the second input table, and convert the second output table into the target table, based on the assignment information;
estimate a constraint relationship between a column of the first input table and a column of the target table, based on a column name of a column included in the first input table and a column name of a column included in the target table; and assign the column included in the first input table to the input slot and assigning the column included in the target table to the output slot, based on the constraint condition indicated by the constraint model and the estimated constraint relationship,
the constraint model includes an input slot indicating a position of the column included in the first input table, an output slot indicating a position of the column included in the first output table, and the constraint condition specified for the input slot and the output slot, and
the assigning includes determining an assignment of a column of the original table or a column of the target table by preferring a slot having a larger number of constraints existing between slots other than the input and output slots among a plurality of slots including the input slot and the output slot.

8. A non-transitory, computer-readable recording medium having stored therein a program for causing a computer included in a table generation device to execute a process comprising:
acquiring a first input table used for generating a target table, based on target table information indicating a column included in the target table to be generated;
acquiring a script for generating a first output table from the first input table, and a constraint model indicating a constraint condition between a column included in the first input table and a column included in the first output table;
converting the first input table into a second input table such that the second input table obtained by converting a column structure of the first input table and a second output table to be obtained by converting a column structure of the target table comply with the constraint condition, and generating assignment information indicating a correspondence relationship between a column to be included in the second output table and a column included in the target table;
generating the second output table from the script and the second input table, and converting the second output table into the target table, based on the assignment information;
estimating a constraint relationship between a column of the first input table and a column of the target table, based on a column name of a column included in the first input table and a column name of a column included in the target table; and
assigning the column included in the first input table to the input slot and assigning the column included in the target table to the output slot, based on the constraint condition indicated by the constraint model and the estimated constraint relationship,
the constraint model includes an input slot indicating a position of the column included in the first input table, an output slot indicating a position of the column included in the first output table, and the constraint condition specified for the input slot and the output slot, and
the assigning includes determining an assignment of a column of the original table or a column of the target table by preferring a slot having a larger number of constraints existing between slots other than the input and output slots among a plurality of slots including the input slot and the output slot.

* * * * *